(12) United States Patent
Hsu et al.

(10) Patent No.: US 11,698,309 B2
(45) Date of Patent: Jul. 11, 2023

(54) LINEAR ACTUATOR

(71) Applicant: Delta Electronics, Inc., Taoyuan (TW)

(72) Inventors: Yu-Han Hsu, Taoyuan (TW); Zi-Xuan Huang, Taoyuan (TW); Yu-Xian Huang, Taoyuan (TW); Yi-Min Liang, Taoyuan (TW); You-Chyau Tsai, Taoyuan (TW); Tsung-En Chan, Taoyuan (TW); Hong-Chih Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 440 days.

(21) Appl. No.: 17/118,545

(22) Filed: Dec. 10, 2020

(65) Prior Publication Data

US 2021/0281157 A1 Sep. 9, 2021

Related U.S. Application Data

(60) Provisional application No. 63/035,168, filed on Jun. 5, 2020, provisional application No. 62/985,555, filed on Mar. 5, 2020.

(51) Int. Cl.
*H02K 41/02* (2006.01)
*G01L 1/00* (2006.01)
(Continued)

(52) U.S. Cl.
CPC .......... *G01L 1/005* (2013.01); *B30B 15/0094* (2013.01); *G01L 1/12* (2013.01);
(Continued)

(58) Field of Classification Search
CPC .......... H02K 41/02; H02K 5/04; H02K 5/225; H02K 7/20; H02K 11/21; H02K 2201/18; H02K 2211/03
See application file for complete search history.

(56) References Cited

U.S. PATENT DOCUMENTS

| 8,839,682 B2 | 9/2014 | Trevisani et al. |
| 11,473,985 B2 * | 10/2022 | Huang .................... G01L 1/005 |
| 2015/0129637 A1 | 5/2015 | Aguirre Artieda et al. |
| 2018/0091017 A1 | 3/2018 | Driker et al. |

FOREIGN PATENT DOCUMENTS

| CN | 102194710 A | 9/2011 |
| JP | 2001333566 A | 11/2001 |

(Continued)

*Primary Examiner* — Dang D Le
(74) *Attorney, Agent, or Firm* — Kirton McConkie; Evan R. Witt

(57) ABSTRACT

The disclosure relates to a linear actuator including a base, a linear motor, a load cell and a rotary motor. The linear motor is disposed on the base and includes a fixed coil module and a movable magnetic backplane. The fixed coil module is fixed on the base, and the movable magnetic backplane is configured to slide relative to the fixed coil module along a first direction. The rotary motor is rotated around a central axis in parallel with the first direction. The load cell has two opposite sides parallel to the first direction, respectively. The movable magnetic backplane of the linear motor and the rotary motor are connected to the two opposite sides of the load cell, respectively. The load cell is subjected to a force applied thereto by the rotary motor and parallel to the first direction, and configured to convert the force into an electrical signal.

20 Claims, 34 Drawing Sheets

(51) Int. Cl.
    *G01L 1/12*     (2006.01)
    *H02K 11/20*     (2016.01)
    *B30B 15/00*     (2006.01)
    *H02K 11/21*     (2016.01)
    *H02K 11/33*     (2016.01)
    *H02K 5/22*     (2006.01)
    *H02K 7/20*     (2006.01)
    *H02K 41/03*     (2006.01)

(52) U.S. Cl.
    CPC ............... *H02K 5/225* (2013.01); *H02K 7/20* (2013.01); *H02K 11/20* (2016.01); *H02K 11/21* (2016.01); *H02K 11/33* (2016.01); *H02K 41/031* (2013.01); *H02K 2211/03* (2013.01)

(56) References Cited

FOREIGN PATENT DOCUMENTS

| | | |
|---|---|---|
| JP | 2009017693 A | 1/2009 |
| JP | 2011155827 A | 8/2011 |
| JP | 2016151462 A | 8/2016 |
| JP | 2018160952 A | 10/2018 |
| JP | 2020020678 A | 2/2020 |
| TW | M524459 U | 6/2016 |
| TW | I577113 B | 4/2017 |
| TW | 201830450 A | 8/2018 |
| TW | I669899 B | 8/2019 |
| WO | 2014181451 A1 | 11/2014 |

\* cited by examiner

LINEAR ACTUATOR

CROSS-REFERENCE TO RELATED APPLICATION

This application claims the benefit of U.S. Provisional Application No. 62/985,555 filed on Mar. 5, 2020, and entitled "LINEAR ACTUATOR", and claims the benefit of U.S. Provisional Application No. 63/035,168 filed on Jun. 5, 2020, and entitled "LINEAR ACTUATOR". The entireties of the above-mentioned patent application are incorporated herein by reference for all purposes.

FIELD OF THE INVENTION

The present disclosure relates to an actuator, and more particularly to a linear actuator having a load cell for calibrating a force generated thereby.

BACKGROUND OF THE INVENTION

At present, miniature linear actuators on the market are mostly used vertically. Due to the characteristics of high speed and high precision, the linear actuators have become indispensable mechanisms in the major semiconductor and panel industries. However, with the improvement of such product specifications, the technical requirements of picking and placing components have become relatively strict in the manufacturing industry. In addition to maintaining the precision of positional accuracy in each reciprocating motion, the reproducibility of force is also an important part. Without the mechanism of force feedback, if the producing component is fragile and not resistant to pressure, there is a risk of over compression and chipping during the process of picking and placing the component, and it is easy to cause the product yield to decline. At present, the miniature linear actuators on the market can achieve force correction through the driver, but the settings must be adjusted once before use because the traditional linear actuators have no feedback mechanism. However, the linear actuators are accompanied by the temperature effect during operation, and the operating temperature is ranged from the room temperature to above 120 degrees C. The temperature difference companied during operation causes the thermal expansion and contraction of the mechanical parts to make the dimensions non-uniform. Moreover, the magnetic force in the magnet is also affected due to the temperature change. In that, the magnetic field is unstable and an uneven force is generated. It causes an error in each output of the force.

Therefore, there is a need of providing a linear actuator to obviate the drawbacks encountered from the prior arts.

SUMMARY OF THE INVENTION

It is an object of the present disclosure to provide a linear actuator having a load cell for calibrating a force generated thereby in a first direction. Since a linear motor and a rotary motor are connected to two opposite sides of the load cell, the load cell and the linear motor are partially overlapped and stacked on the base, so as to minimize the entire size of the linear actuator. Moreover, at least two of the main components are arranged along the first direction, so as to minimize the offset relative to the center of gravity of the entire linear actuator in the first direction. It facilitates the linear actuator to be hung up and applied to a process of picking and placing components in the first direction. Namely, the linear actuator of the present disclosure has the load cell mounted thereon to form a slim arrangement. When the linear actuator is applied to a process of picking and placing components, the supporting and the center of gravity of the entire linear actuator are offset in the direction of picking and placing components. With the slim arrangement, it facilitates to avoid shaking due to the movement or the force exerted thereon.

It is another object of the present disclosure to provide a linear actuator having a load cell, so as to be applied to a process of picking and placing components. With the load cell to calibrate a force generated by the linear actuator, when the linear actuator is applied to the process of picking and placing components in a reciprocating motion, the force applied to the components is measured by the load cell, and the correction of the force and the position in the reciprocating motion is preformed. Thus, the precision of positional accuracy in each reciprocating motion is maintained. It prevents from over compression and chipping during the process of picking and placing the components. Moreover, the load cell is for example a strain gauge load cell including a spring element and a set of strain gauges for measuring the force in a specific range. When the force is exerted on the load cell, the spring element of the load cell is slightly deformed, and unless overloaded, always returns to its original shape. As the spring element deforms, the strain gauges disposed on the spring element are also deformed, and the deformation of strain gauges is converted into an electrical signal, which is fed back to a driver connected to the linear actuator. Namely, the amount of the force is calculated according to the output of the load cell and fed back to the driver connected to the linear actuator. It facilitates the driver connected to the linear actuator to control the linear actuator and maintain the precision of positional accuracy in the process of picking and placing components. Moreover, the temperature effect during operation is eliminated and the reproducibility of force is achieved. On the other hand, in order to avoid an over loading, which causes an irreversible permanent deformation and material damage of the load cell, a special design of a limitation part is introduced to the structure of the load cell. The load cell is subjected to deformation in a certain space. Under the effect of supporting and limiting displacement through the limitation part, it prevents the load cell from being damaged due to excessive force deformation.

In accordance with one aspect of the present invention, a linear actuator is hung through a connection component along a first direction and includes a base, a linear motor, a linear encoder, a load cell and a rotary motor. The linear motor is disposed on the base and includes a fixed coil module and a movable magnetic backplane. The fixed coil module is fixed on the base, and the movable magnetic backplane is configured to slide relative to the fixed coil module along the first direction. The linear encoder is disposed between the base and the movable magnetic backplane of the linear motor and configured to detect a linear displacement of the movable magnetic backplane relative to the base. The rotary motor is rotated around a central axis in parallel with the first direction. The load cell has two opposite sides parallel to the first direction, respectively. The movable magnetic backplane of the linear motor and the rotary motor are connected to the two opposite sides of the load cell, respectively. The load cell is subjected to a force applied thereto by the rotary motor and parallel to the first direction, and configured to convert the force into an electrical signal.

In an embodiment, at least two of the load cell, the movable magnetic backplane and the fixed coil module are stacked on the base in a second direction vertical to the first direction.

In an embodiment, a projection of the load cell on the base and a projection of the movable magnetic backplane on the base are partially overlapped.

In an embodiment, a projection of the movable magnetic backplane on the base and a projection of the fixed coil module on the base are partially overlapped.

In an embodiment, the movable magnetic backplane spatially corresponds to the fixed coil module and includes a first group of magnet members and a second group of magnet members, wherein the first group of magnet members and the second group of magnet members are disposed on two opposite inner surfaces of the movable magnetic backplane and spatially correspond to two outer surfaces of the fixed coil module.

In an embodiment, the first group of magnet members are arranged along the first direction, and the second group of magnet members are arranged along the first direction.

In an embodiment, the fixed coil module includes a plurality of coil members arranged one by one along the first direction.

In an embodiment, the base includes a linear guiding rail, and the linear motor includes a sliding member fixed on the movable magnetic backplane, wherein the sliding member is slidably coupled to the linear guiding rail and freely reciprocates along a length direction of the linear guiding rail.

In an embodiment, the rotary motor includes a connection part, and the rotary motor is mounted on the load cell through the connection part.

In an embodiment, the connection part of the rotary motor and the movable magnetic backplane of the linear motor are mounted on two opposite sides of the load cell.

In an embodiment, the rotary motor includes a working head disposed at an end of the rotary motor and configured to perform a process of picking and placing a component.

In an embodiment, the linear actuator further includes an anti-fall module disposed between the base and the movable magnetic backplane of the linear motor.

In an embodiment, the linear actuator further includes an anti-fall module disposed between the base and the rotary motor.

In an embodiment, the linear actuator further includes a communication printed circuit board and a connection board, wherein the communication printed circuit board is mounted on the base, and the connection board is mounted on the movable magnetic backplane of the linear motor, wherein the communication printed circuit board is electrically connected to the connection board.

In an embodiment, at least two of the linear motor, the load cell, the communication printed circuit board, the connection board and the rotary motor are arranged along the first direction.

In an embodiment, the linear actuator further includes a cover assembled with the base for accommodating the linear motor, the load cell, the rotary motor, the communication printed circuit board and the connection board.

In an embodiment, the linear actuator is further externally connected to a driver. Preferably but not exclusively, the driver is electrically connected to the linear motor and the rotary motor, and configured to control the linear motor and the rotary motor, respectively.

In an embodiment, the load cell and the rotary motor are electrically connected to the driver through the connection board and the communication printed circuit board.

In an embodiment, the load cell includes a spring element, at least one strain gauge and a hollow portion, wherein the at least one strain gauge is secured on the spring element, and the hollow portion passes through the spring element, wherein when the force is exerted on the load cell, the spring element is deformed, and the at least one strain gauge changes shape, so that the force generated from the rotary motor is measured and standardized.

In an embodiment, the load cell further includes at least one limitation part extended into the hollow portion, and at least one gap is formed between the spring element and the limitation part in the first direction.

In an embodiment, at least two of the linear motor, the load cell and the rotary motor are arranged along the first direction.

In an embodiment, the connection component is a cable connecting the linear actuator to a driver.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
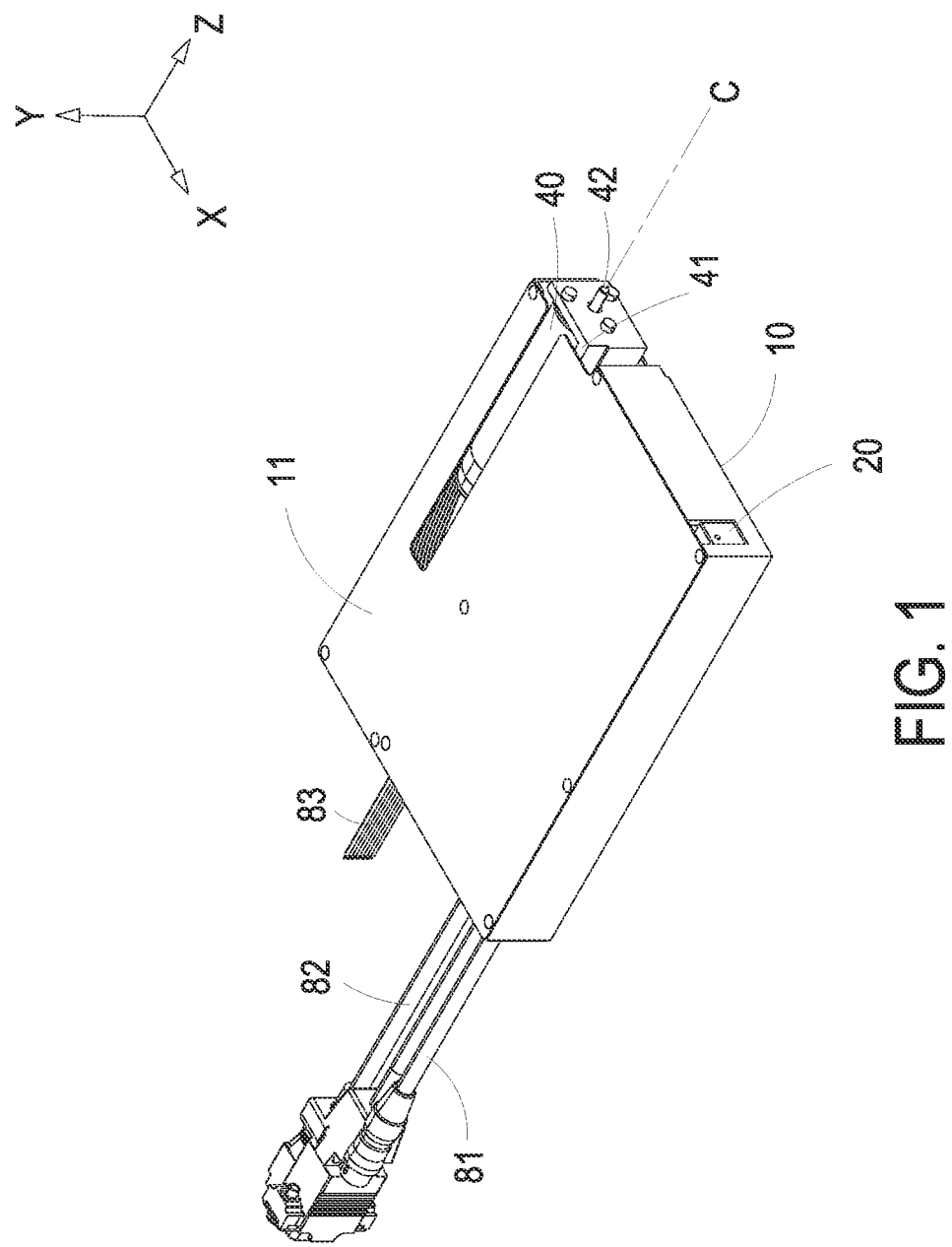
FIG. 1 is a schematic exterior view illustrating a linear actuator according to a first embodiment of the present disclosure.
Figure 2:
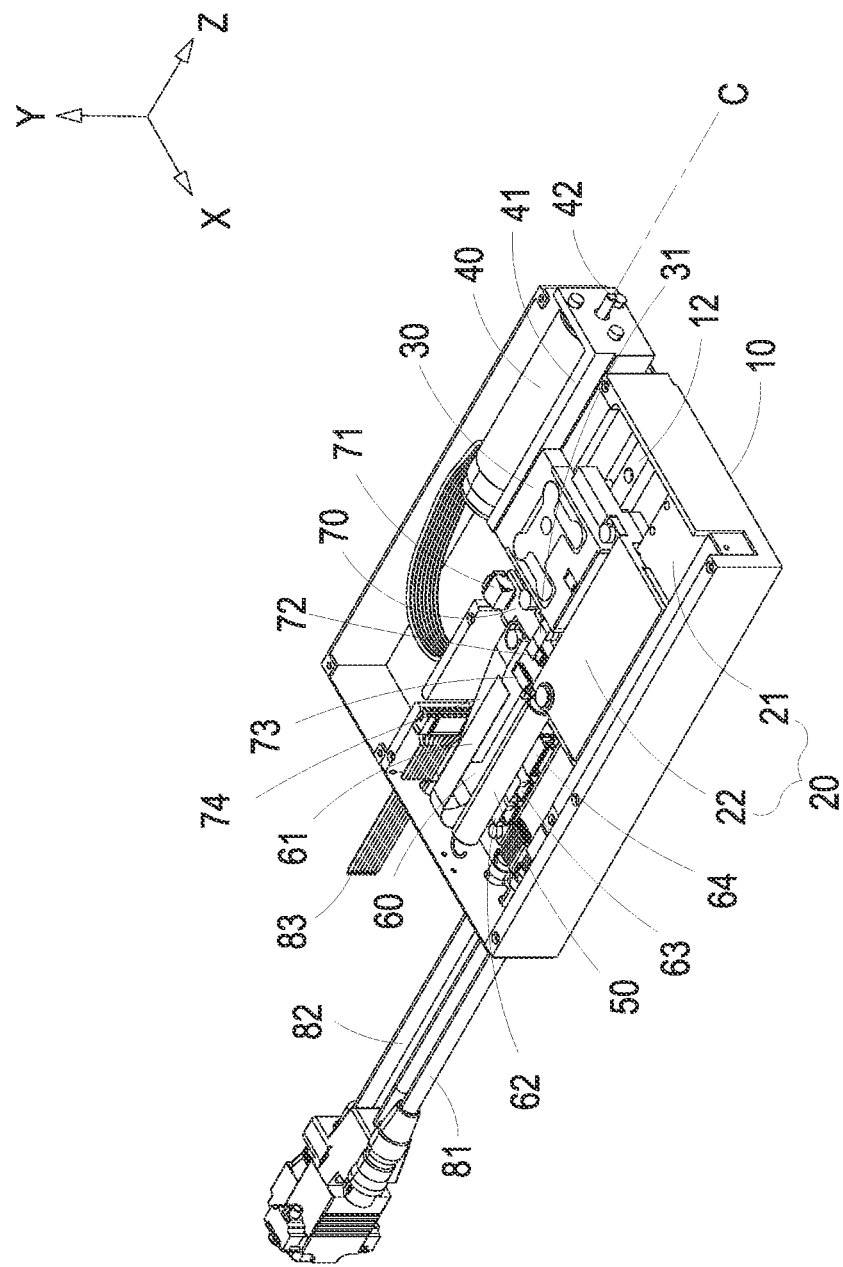
FIG. 2 is a schematic interior view illustrating the linear actuator according to the first embodiment of the present disclosure.
Figure 3:
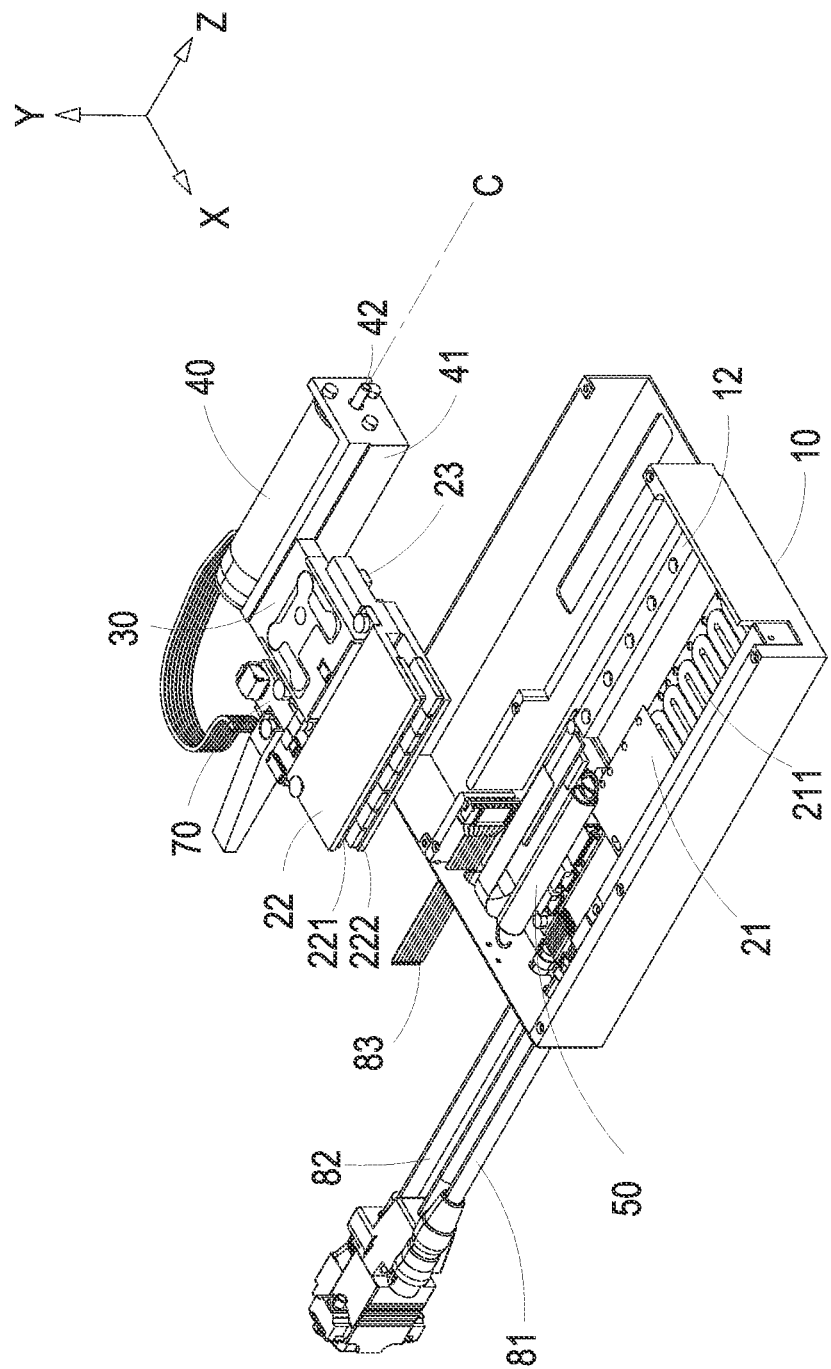
FIG. 3 is a schematic exploded view illustrating the linear actuator according to the first embodiment of the present disclosure.
Figure 4:
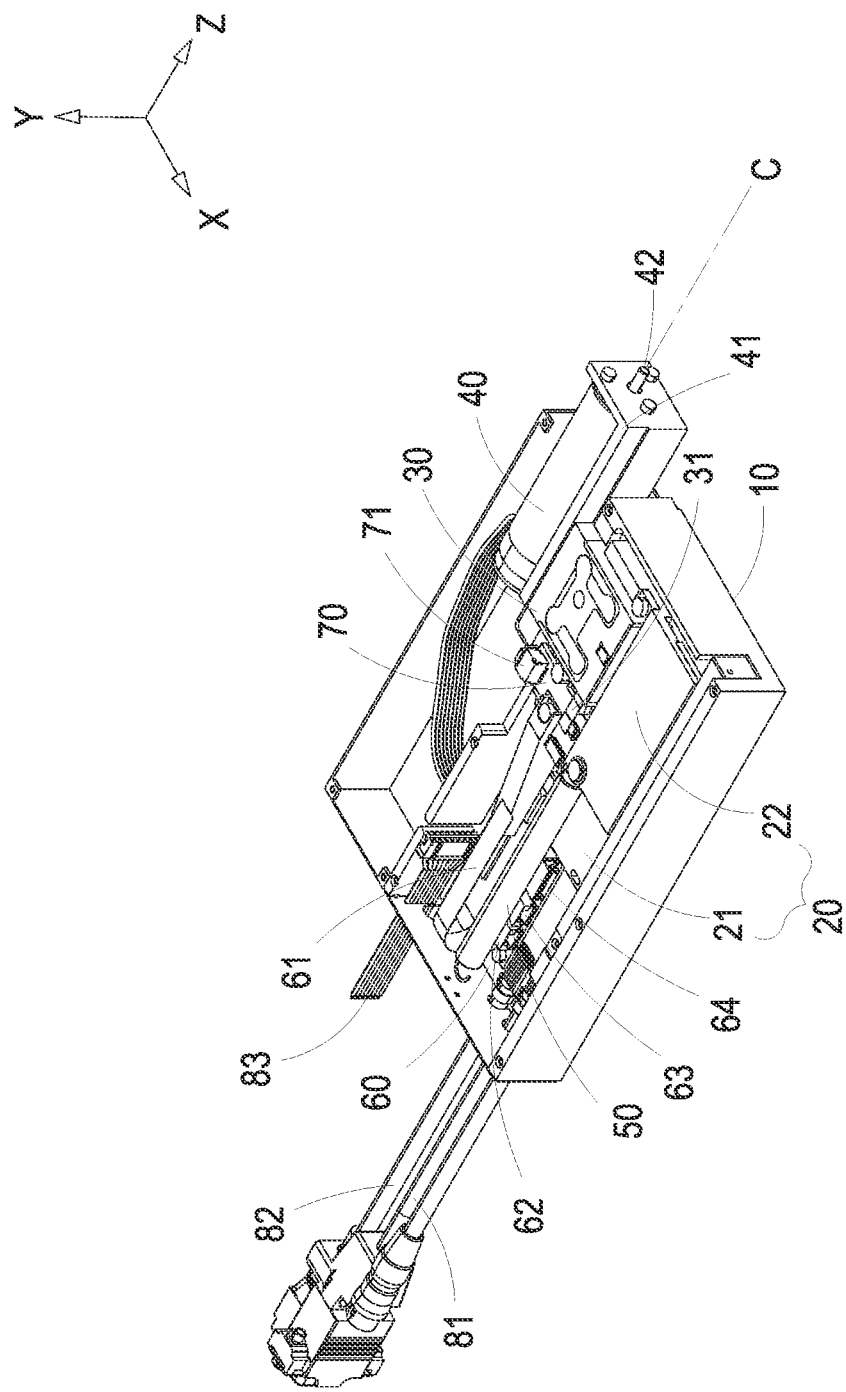
FIG. 4 shows the movable magnetic backplane sliding relative to the fixed coil module of the linear actuator according to the first embodiment of the present disclosure.
Figure 5:
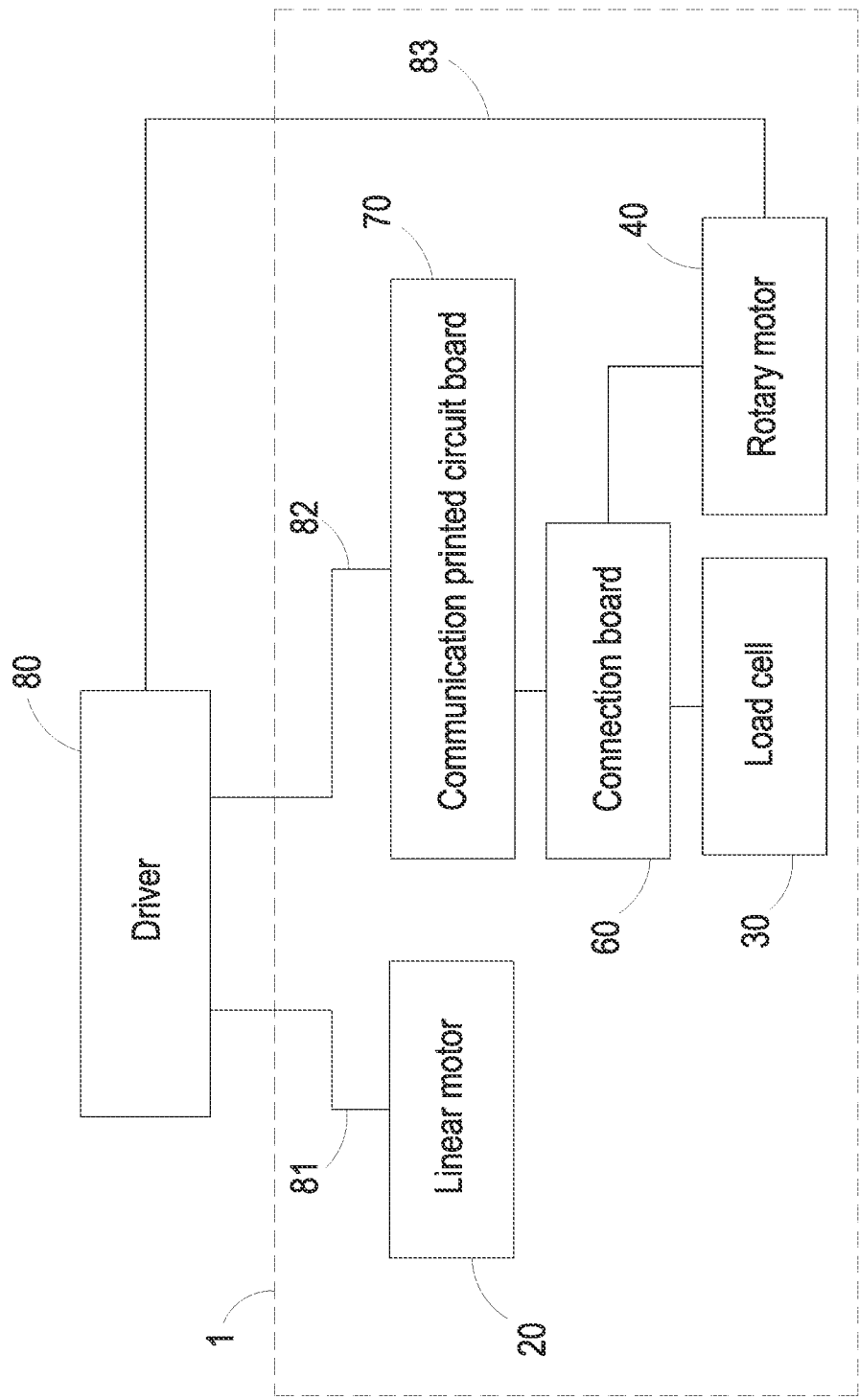
FIG. 5 is a circuit connection diagram of the linear actuator according to the first embodiment of the present disclosure.

FIG. 1 is a schematic exterior view illustrating a linear actuator according to a first embodiment of the present disclosure. FIG. 2 is a schematic interior view illustrating the linear actuator according to the first embodiment of the present disclosure. FIG. 3 is a schematic exploded view illustrating the linear actuator according to the first embodiment of the present disclosure. FIG. 4 shows the movable magnetic backplane sliding relative to the fixed coil module of the linear actuator according to the first embodiment of the present disclosure. FIG. 5 is a circuit connection diagram of the linear actuator according to the first embodiment of the present disclosure. As shown in FIGS. 1 to 5, the linear actuator 1 of the present disclosure can be hung through a connection component along a first direction, which is for example but not limited to the Z-axis direction. Preferably but not exclusively, the connection component is a cable 81 or cable 82, which connect the linear actuator 1 to a driver 80 therefor. Namely, the connection component is adjustable according to the practical requirement. The present disclosure is not limited thereto. In the embodiment, the linear actuator 1 includes a base 10, a linear motor 20, a linear encoder 74, a load cell 30, and a rotary motor 40. The linear motor 20 is disposed on the base 10. The linear motor 20 includes a fixed coil module 21 and a movable magnetic backplane 22. The fixed coil module 21 is fixed on the base 10, and the movable magnetic backplane 22 is configured to slide relative to the fixed coil module 21 along the first direction, (i.e., the Z-axis direction). The fixed coil module 21 includes a plurality of coil members 211. The plurality of coil members 211 are arranged one by one along the first direction (i.e., the Z-axis direction). The movable magnetic backplane 22 spatially corresponds to the fixed coil module 21 and includes a first group of magnet members 221 and a second group of magnet members 222. The first group of magnet members 221 and the second group of magnet members 222 are disposed on two opposite inner surfaces of the movable magnetic backplane 22 and spatially correspond to two opposite outer surfaces of the fixed coil module 21, respectively. Preferably but not exclusively, the base 10 further includes a linear guiding rail 12, and the linear motor 20 further includes a sliding member 23 fixed on the movable magnetic backplane 22. The sliding member 23 is slidably coupled to the linear guiding rail 12 and freely reciprocates relative to the linear guiding rail 12, for example along a length direction of the linear guiding rail 12. Preferably but not exclusively, the length direction of the linear guiding rail 12 is similar or parallel to the first direction (i.e., the Z-axis direction). In the embodiment, the plurality of coil members 211 are arranged along a line in parallel with the linear guiding rail 12. Preferably, the first group of magnet members 221 are arranged in a line in parallel with the linear guiding rail 12, and the second group of magnet members 222 are arranged in a line in parallel with the linear guiding rail 12. Namely, the plurality of coil member 211, the first group of magnet members 221 and the second group of magnet members 222 are arranged along the first direction (i.e., the Z-axis direction). Each of the first group of magnet members 221 has an N magnetic pole or an S magnetic pole. Each of the second group of magnet members 222 has an N magnetic pole or an S magnetic pole. In an embodiment, the N magnetic poles and the S magnetic poles in the first group of magnetic members 221 are alternatively arranged, and the N magnetic poles and the S magnetic poles in the second group of magnetic members 222 are alternatively arranged. The first group of magnet members 221 and the second group of magnet member 222 of the movable magnetic backplane 22 are configured to generate magnetic field. The coil members 211 of the fixed coil module 21 arranged corresponding to the first group of magnet members 221 and the second group of magnet members 222 of the movable magnetic backplane 22 generate shifting magnetic fields as AC current is supplied through the coil members 211 of the fixed coil module 21. Consequently, a magnetic repulsive force or a magnetic attractive force is generated to form a driving force to push the movable magnetic backplane 22 to move. Thus, the movable magnetic backplane 22 is slid relative to the fixed coil module 21 along the first direction.

In the embodiment, the linear encoder 74 is disposed between the base 10 and the movable magnetic backplane 22 of the linear motor 20 and configured to detect a linear displacement of the movable magnetic backplane 22 relative to fixed coil module 21 and the base 10.

In the embodiment, the load cell 30 has two opposite sides parallel to the first direction (i.e., the Z-axis direction). The rotary motor 40 and the movable magnetic backplane 22 of the linear motor 20 are connected to the two opposite sides of the load cell 30, respectively. Namely, the load cell 30 is mounted between the rotary motor 40 and the movable magnetic backplane 22. In addition, at least two of the load cell 30, the movable magnetic backplane 22 and the fixed coil module 21 are partially overlapped and stacked on the base 10 in a second direction, for example but not limited to Y-axis direction, which is perpendicular to the first direction (i.e., the Z-axis direction). In the embodiment, a projection of the load cell 30 on the base 10 and a projection of the movable magnetic backplane 22 of the linear motor 20 on the base 10 are partially overlapped. Moreover, a projection of the movable magnetic backplane 22 on the base 10 and a projection of the fixed coil module 21 on the base 10 are partially overlapped. It facilitates the linear actuator 1 to minimize the entire size. Preferably but not exclusively, the load cell 30 is a type of a force transducer. The movable magnetic backplane 22 drives the load cell 30 and the rotary motor 40 to move together. When an end of the rotary motor 40 is subjected to a force applied in the first direction, the load cell 30 is configured to convert the force applied thereto by the rotary motor 40 into an electrical signal, so that the force generated from the rotary motor 40 is measured and standardized. As the force applied to the load cell 30 increases, the electrical signal changes proportionally. Preferably but not exclusively, the load cell 30 is a strain gauge load cell, which is ideal as it is highly accurate, versatile, and cost-effective. The structure of the load cell 30 is described in detail later.

In the embodiment, the rotary motor 40 is rotated around a central axis C in parallel with the first direction, and further includes a connection part 41. The rotary motor 40 is mounted on the load cell 30 through a connection part 41, and configured to move with the load cell 30 and the movable magnetic backplane 22 of the linear motor 20 along the first direction, for example but not limited to the Z-axis direction. Preferably but not exclusively, the connection part 41 is an L-shaped structure. Moreover, the rotary motor 40 is rotatable around the central axis C, which is in parallel with the first direction (i.e., the Z-axis direction). In the embodiment, the rotary motor 40 further includes a working head 42 disposed at an end of the rotary motor 40 and configured to perform the process of picking and placing a component, but the disclosure is not limited thereto.

In the embodiment, the linear actuator 1 further includes an anti-fall module 50. Preferably but not exclusively, the anti-fall module 50 is disposed between the base 10 and the movable magnetic backplane 22 of the linear motor 20, so as to prevent the movable magnetic backplane 22 from falling. Preferably but not exclusively, the anti-fall module 50 is a spring and includes two opposite ends connected to the base 10 and the movable magnetic backplane 22 of the linear motor 20, respectively. In some other embodiments, the anti-fall module 50 is disposed between the base 10 and the rotary motor 40 for preventing the rotary motor 40 from falling. Certainly, the present disclosure is not limited thereto.

In the embodiment, the linear actuator 1 further includes a communication printed circuit board 60 and a connection board 70. The communication printed circuit board 60 is mounted on the base 10 through fastening elements (i.e. screws), so that the communication printed circuit board 60 is securely connected to the base 10. The connection board 70 is mounted on the movable magnetic backplane 22 of the linear motor 20 through fastening elements (i.e. screws), so that the connection board 70 is securely connected to the movable magnetic backplane 22. The communication printed circuit board 60 includes a first flexible printed circuit (FPC) panel 61, a first connector 62, a second connector 63 and a third connector 64, which are disposed on a surface of the communication printed circuit board 60. The connection board 70 includes a fourth connector 71, a fifth connector 72 and a sixth connector 73, which are disposed on a surface of the connection board 70. In the embodiment, the linear encoder 74 is disposed between the connection board 70 mounted on the movable magnetic backplane 22 and the communication printed circuit board 60 mounted on the base 10 and configured to detect the linear displacement of the movable magnetic backplane 22 relative to the fixed coil module 21 and the base 10. Preferably but not exclusively, the linear encoder 74 is an optical ruler. The first FPC panel 61 is connected to the sixth connector 73 of the connection board 70, so that the communication printed circuit board 60 is electrically connected to the connection board 70. Preferably but not exclusively, the sixth connector 73 is a 14-pin connector. Preferably but not exclusively, the fourth connector 71 is a 6-pin connector and configured to connect with an encoder of the rotary motor 40. The load cell 30 further includes a second FPC 31, which is connected to the fifth connector 72 on the connection board 70. Preferably but not exclusively, the fifth connector 72 is an 8-pin connector. In addition, the first connector 62 is for example but not limited to a 6-pin connector for an output of the encoder of the rotary motor 40. Preferably but not exclusively, the second connector 63 is a 6-pin connector for an output of communication. Preferably but not exclusively, the third connector 64 is an 8-pin connector for the Hall sensor or the negative temperature coefficient (NTC) sensor.

Preferably but not exclusively, the linear actuator 1 further includes a cover 11 assembled with the base 10, so as to accommodate the linear motor 20, the load cell 30, the rotary motor 40, the anti-fall module 50, the communication printed circuit board 60 and the connection board 70.

In the embodiment, the linear actuator 1 is further externally connected to a driver 80. Preferably but not exclusively, the driver 80 is electrically connected to the linear motor 20 and the rotary motor 40, and configured to control the linear motor 20 and the rotary motor 40, respectively. For example but not exclusively, the linear guiding rail 12 is disposed along the Z-axis direction, and the movable magnetic backplane 22 is configured to slide relative to the fixed coil module 21 by the control of the driver 80. The linear motor 20 is electrically connected to the driver 80 though a cable 81, so that the electrical power and the control signal is provided to the linear motor 20.

In the embodiment, the communication printed circuit board 60 is further electrically connected to the driver 80 though a cable 82. Consequently, the load cell 30 and the rotary motor 40 are electrically connected to the driver 80 through the connection board 70 and the communication printed circuit board 60, and the driver 80 is capable of receiving the feedback of the load cell 30 and the information of the rotary motor 40. On the other hand, the rotary motor 40 further electrically connected to the driver 80 through a power cable 83, so that the power is supplied to the rotary motor 40 through the power cable 83. The present disclosure is not limited thereto.

On the other hand, in order to minimize the offset of each main component relative to the center of gravity of the entire linear actuator 1 in the first direction (i.e., the Z-axis direction), at least two of the linear motor 20, the load cell 30, the communication printed circuit board 60, the connection board 70 and the rotary motor 40 are arranged along the first direction (i.e., the Z-axis direction). In the embodiment, the load cell 30, the connection board 70 and the communication printed circuit board 60 are arranged in the first direction. The linear motor 20 and the communication printed board 60 are also arranged along the first direction. In the embodiment, a projection of the load cell 30 on the base 10 and a projection of the movable magnetic backplane 22 of the linear motor 20 on the base 10 are partially overlapped. Moreover, a projection of the movable magnetic backplane 22 on the base 10 and a projection of the fixed coil module 21 on the base 10 are partially overlapped. Namely, at least two of the load cell 30, the movable magnetic backplane 22 and the fixed coil module 21 are stacked on the base 10 in a second direction, for example but not limited to the Y-axis direction, which is perpendicular to the first direction (i.e., the Z-axis direction). Consequently, when the linear actuator 1 is hung up and applied to a process of picking and placing components in the first direction, it is easy to hang up the linear actuator 1.

Figure 6:
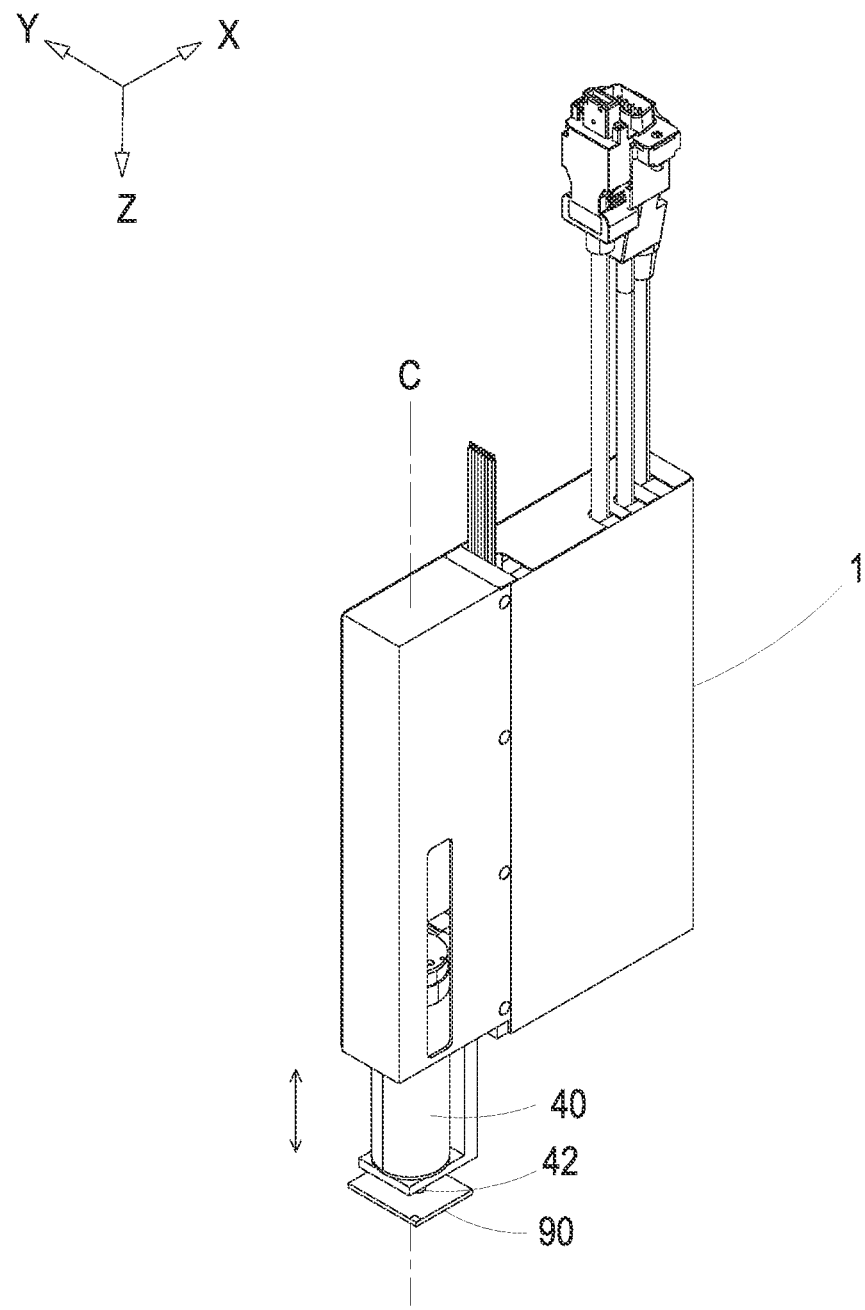
FIGS. 6 to 8 schematically show the actions of the linear actuator according to the first embodiment of the present disclosure.
Figure 7:
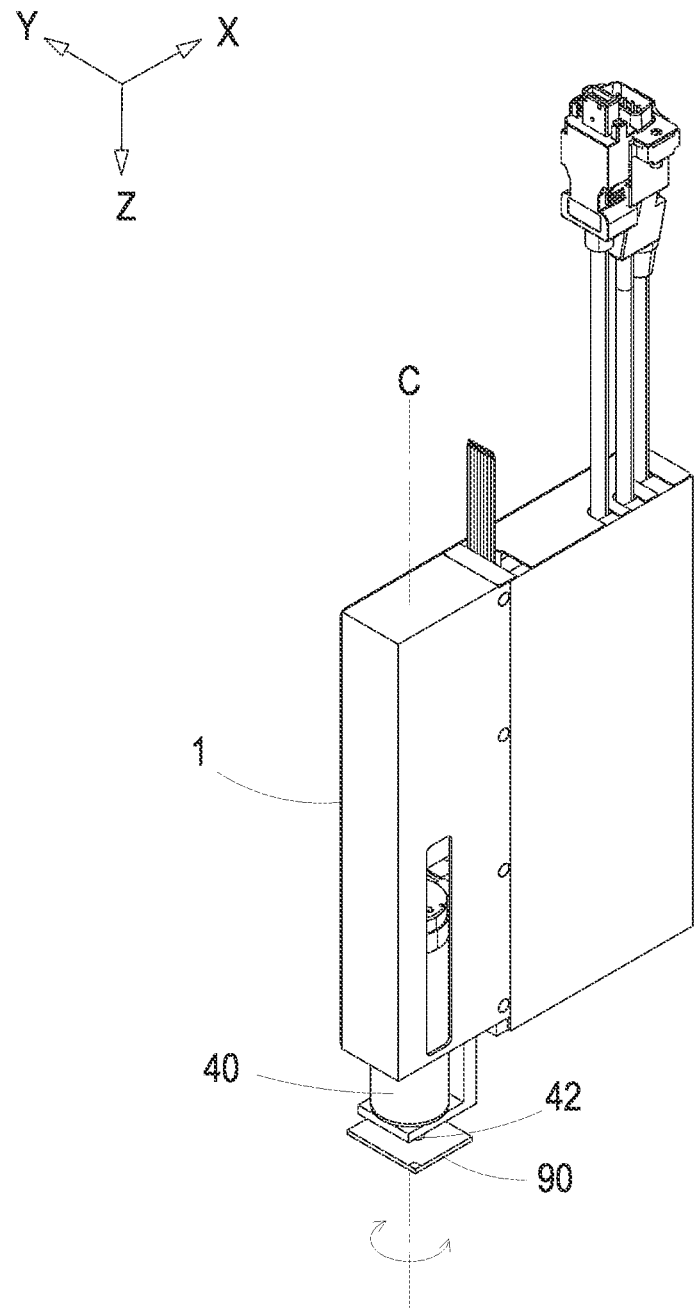
Figure 8:
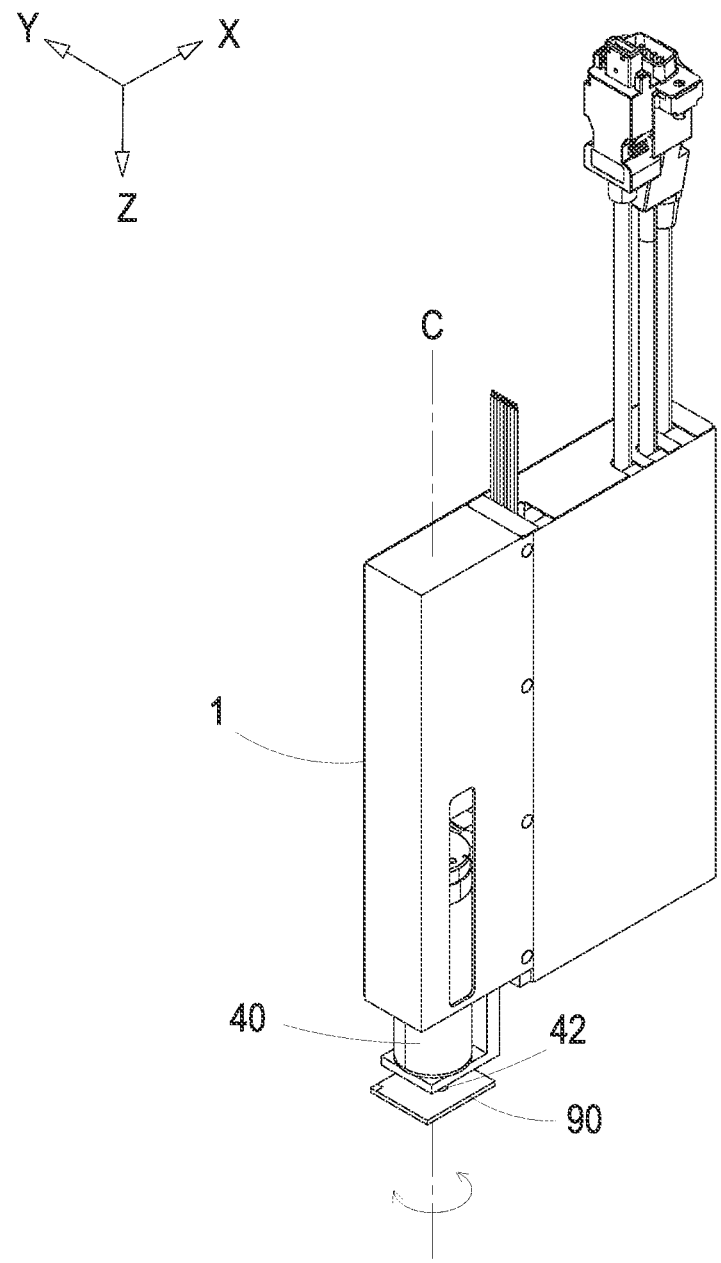

FIGS. 6 to 8 schematically show the actions of the linear actuator according to the first embodiment of the present disclosure. As shown in FIGS. 5 to 7, when the linear motor 20 is actuated by the driver 80, the movable magnetic backplane 22 is slid relative to the fixed coil module 21, and the movable magnetic backplane 22 further drives the rotary motor 40 to move along the first direction, for example but not limited to the Z-axis direction. In that, the working head 42 is utilized to pick and place the component 90. On the other hand, as shown in FIGS. 5, 7 and 8, when the rotary motor 40 is actuated by the driver 80, the rotary motor 40 is rotated around the central axis C in parallel with the first direction (i.e., the Z-axis direction). In that, the working head 42 is utilized to rotate the component 90 picked thereby.

Figure 9:
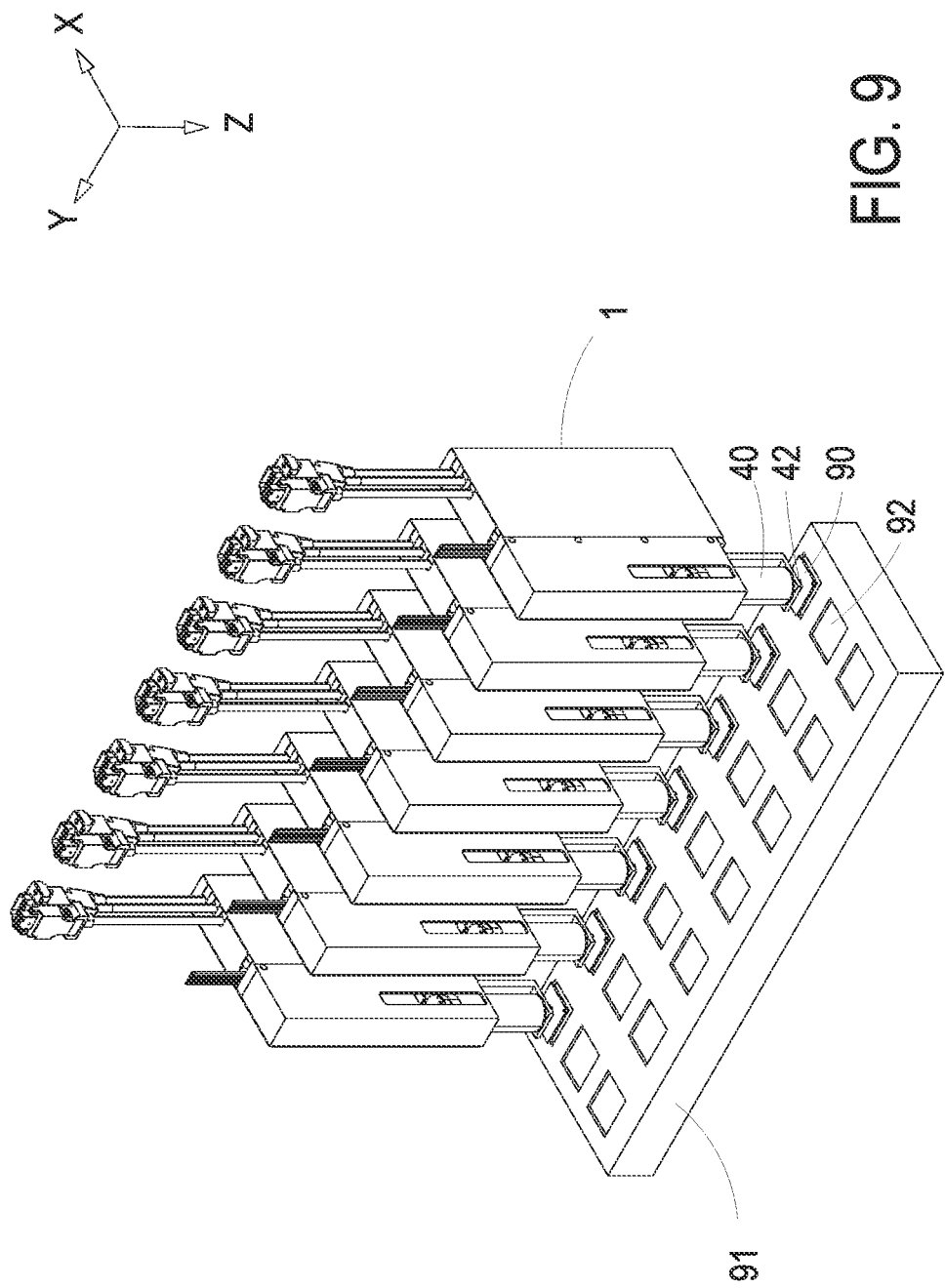
FIG. 9 schematically shows an exemplary process of picking and placing components.

Preferably but not exclusively, the linear actuator 1 of the present disclosure is further applied to the process of picking and placing components. FIG. 9 schematically shows an exemplary process of picking and placing components. A plurality of linear actuators 1 of the present disclosure are arranged in a line, for example but not limited to in parallel with the Y-axis direction. The plurality of linear actuators 1 are driven by the corresponding drivers 80 (referred to FIG. 5), so that the process of picking and placing the components 90 arranged on a plurality of first receiving seats 92 of a first stage 91 is performed smoothly.

Figure 10:
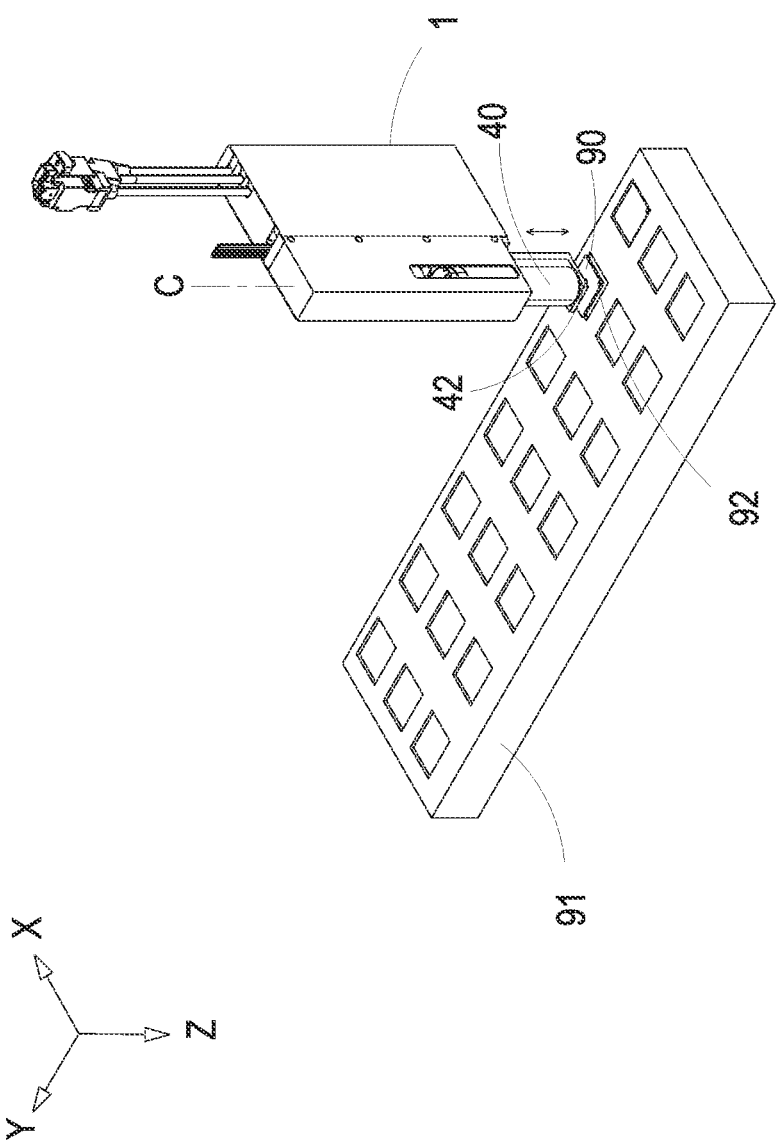
FIGS. 10 to 13 schematically show another exemplary process of picking and placing components.
Figure 11:
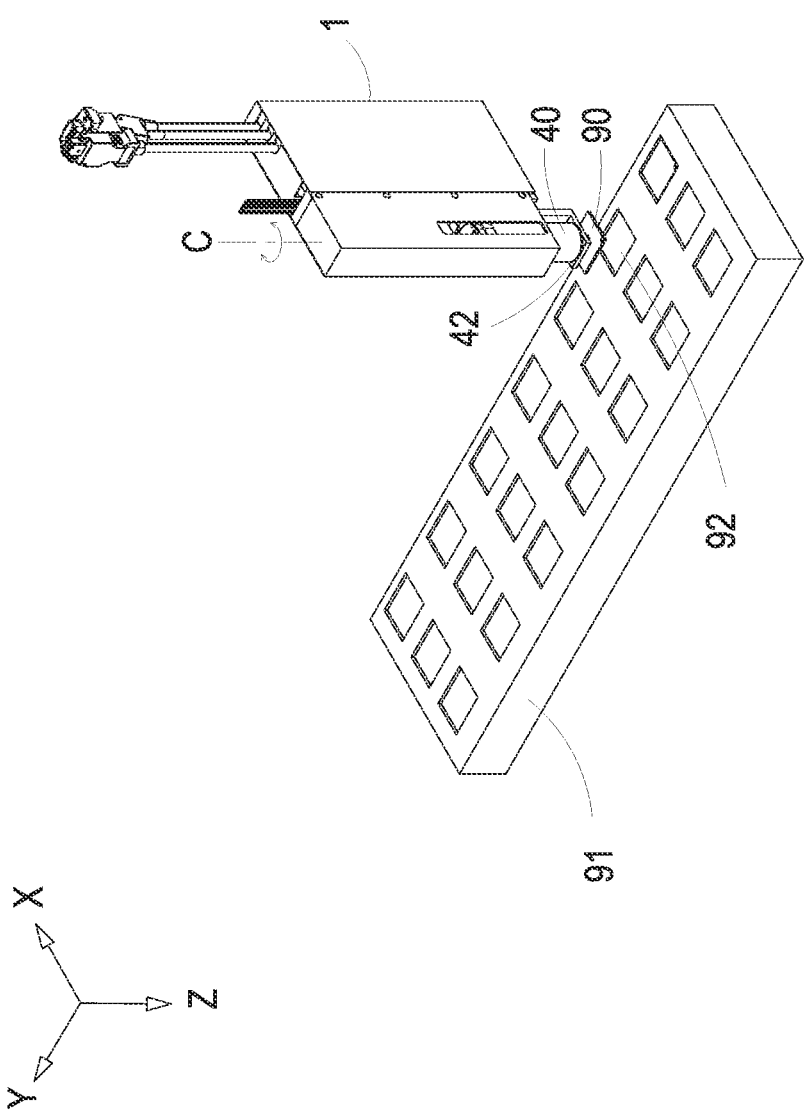
Figure 12:
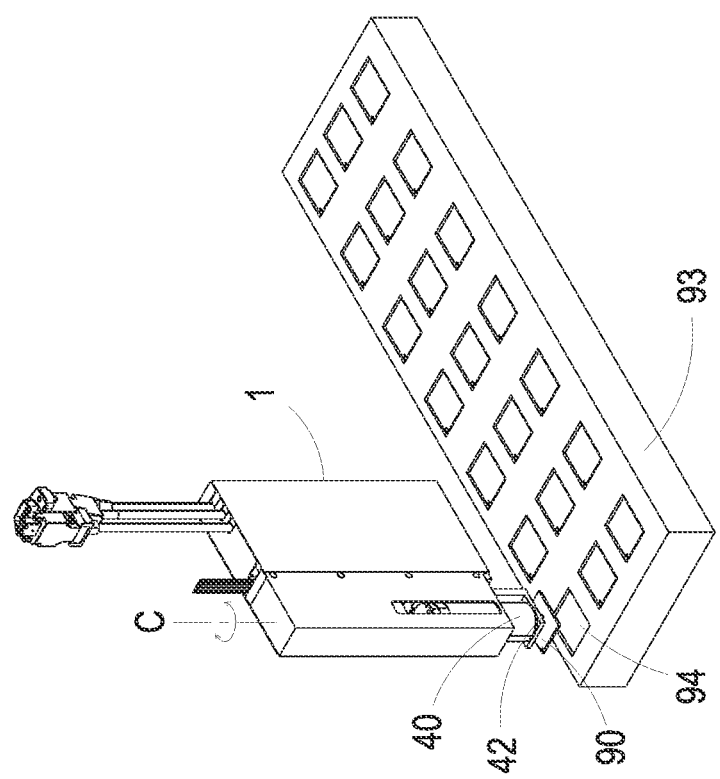
Figure 13:
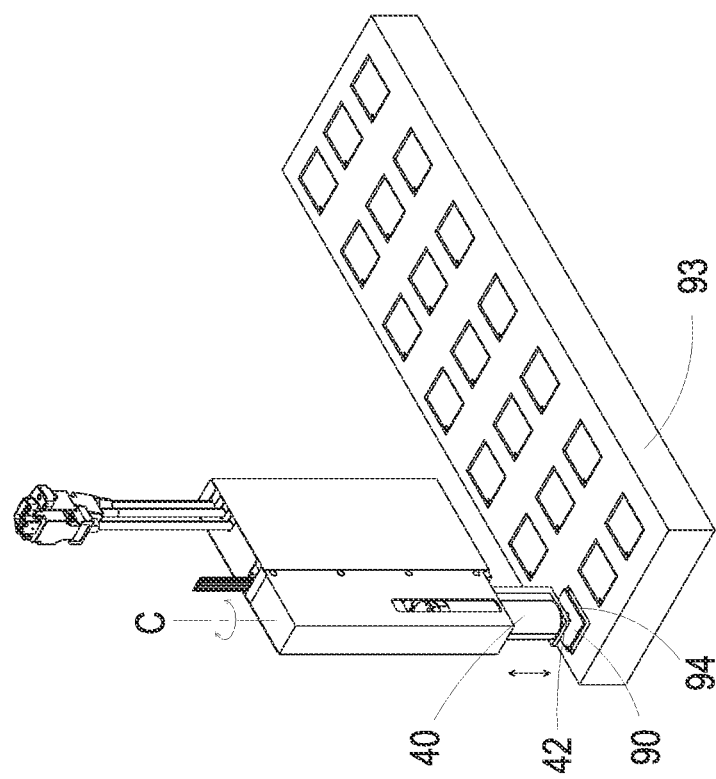

In addition, FIGS. 10 to 13 schematically show another exemplary process of picking and placing components. As shown in FIGS. 4, 5 and 10, the movable magnetic backplane 22 of the linear actuator 1 of the present disclosure is driven to slide relative to the fixed coil module 21, and the movable magnetic backplane 22 further drives the rotary motor 40 to move downwardly along the first direction, for example but not limited to the Z-axis direction. In that, the working head 42 is displaced to force the surface of the component 90, and the component 90 is picked from the first receiving seat 92 of the first stage 91. After the component 90 is picked from the first receiving seat 92 of the first stage 91, as shown in FIGS. 4, 5 and 11, the movable magnetic backplane 22 of the linear actuator 1 is driven to slide relative to the fixed coil module 21, and the movable magnetic backplane 22 further drives the rotary motor 40 to move upwardly along the first direction, for example but not limited to the Z-axis direction. In that, the working head 42 and the picked component 90 are displaced upwardly. Under this circumstance, the rotary motor 40 can be actuated to rotate the component 90 picked by the working head 42, and the entire linear actuator 1 can be drive to move, so as to transport the component 90. As shown in FIGS. 4, 5 and 12, when the entire linear actuator 1 is moved above a second stage 93 having a plurality of second receiving seats 94, the rotary motor 40 is driven to rotate the component 90, to fit the corresponding second receiving seat 94. Then, as shown in FIGS. 4, 5 and 13, the movable magnetic backplane 22 of the linear actuator 1 of the present disclosure is driven to slide relative to the fixed coil module 21, and the movable magnetic backplane 22 further drives the rotary motor 40 to move downwardly along the first direction, for example but not limited to the Z-axis direction. When the component 90 is attached to the corresponding second receiving seat 94, the working head 42 releases the component 90, so that the component 90 is placed on the corresponding second receiving seat 94 on the second stage 93. Certainly, the present is not limited thereto and not redundantly described herein.

Notably, with the load cell 30 having two opposite sides parallel to the first direction (i.e., the Z-axis direction), respectively, the rotary motor 40 and the movable magnetic backplane 22 of the linear motor 20 are connected to the opposite sides of the load cell 30, respectively, so that the foregoing force generated between the working head 42 and the component 90 during picking in the first direction can be calibrated. Preferably but not exclusively, the load cell 30 is a type of a force transducer. When the linear actuator 1 is applied to the process of picking and placing components in a reciprocating motion along the first direction, the force applied to the components 90 is measured by the load cell 30, and the correction of the force and the position in the reciprocating motion along the first direction is preformed. Thus, the precision of positional accuracy in each reciprocating motion is maintained. It prevents from over compression and chipping during the process of picking and placing the components 90.

Figure 14:
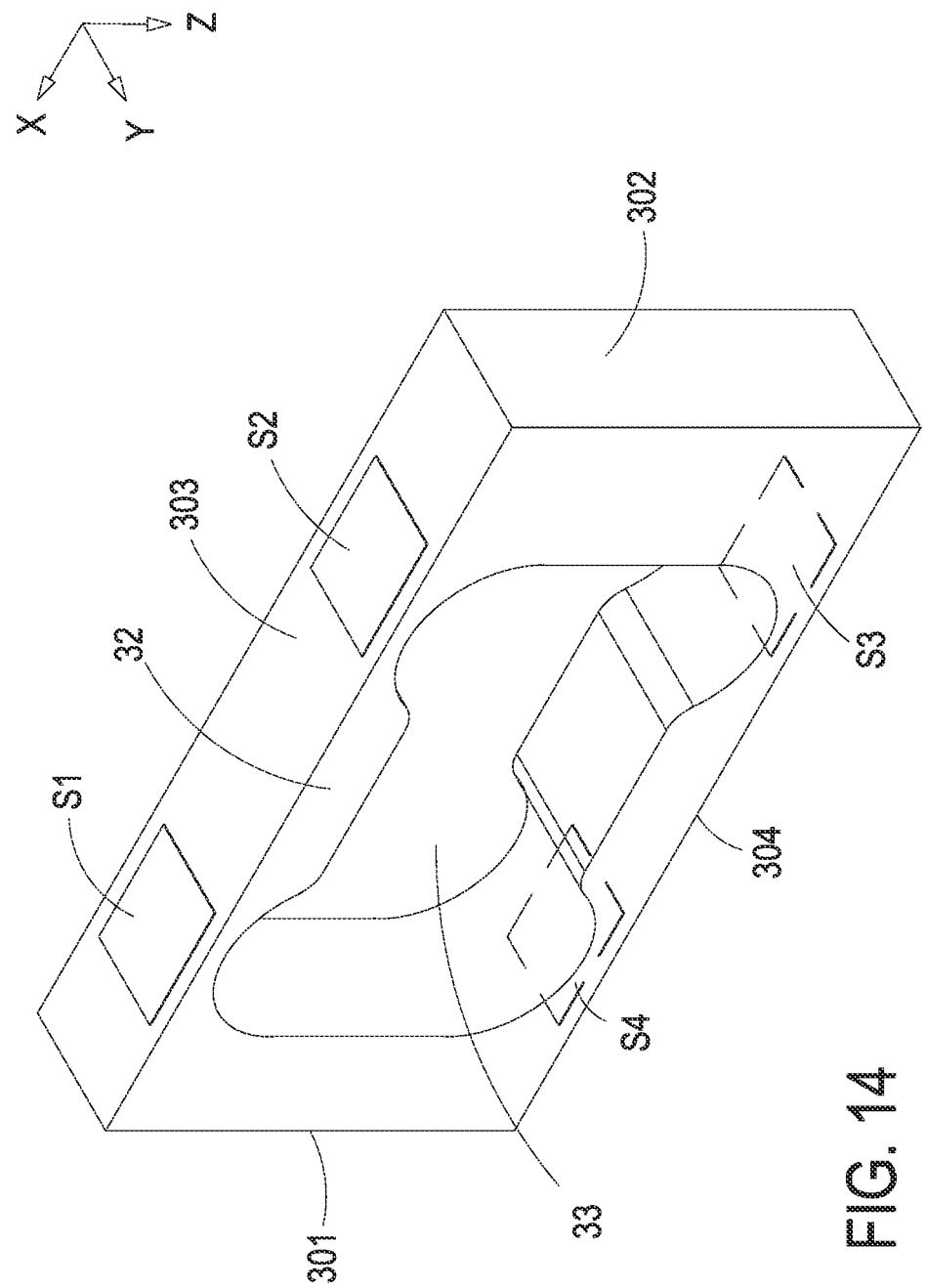
FIG. 14 schematically shows a first exemplary structure of the load cell utilized in the present disclosure.
Figure 15:
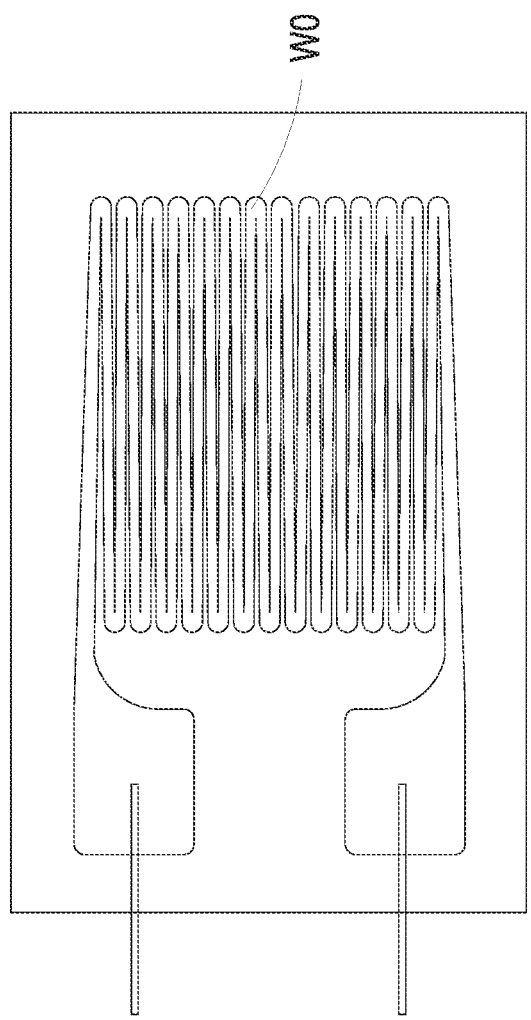
FIG. 15 schematically shows an exemplary structure of a strain gauge utilized in the present disclosure.
Figure 16:
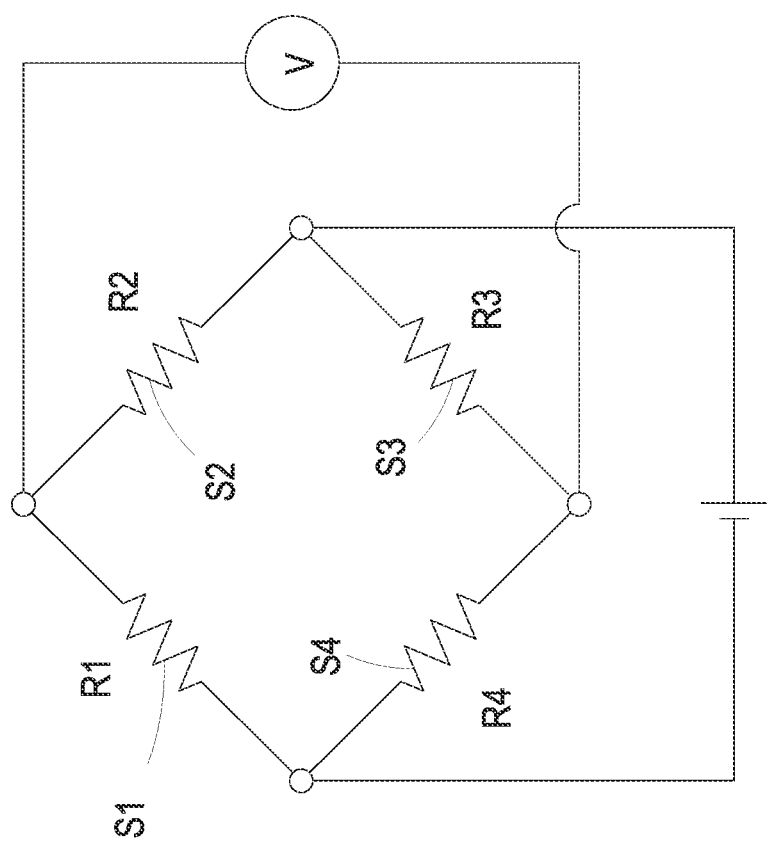
FIG. 16 is a circuit diagram of the load cell of the present disclosure.
Figure 17:
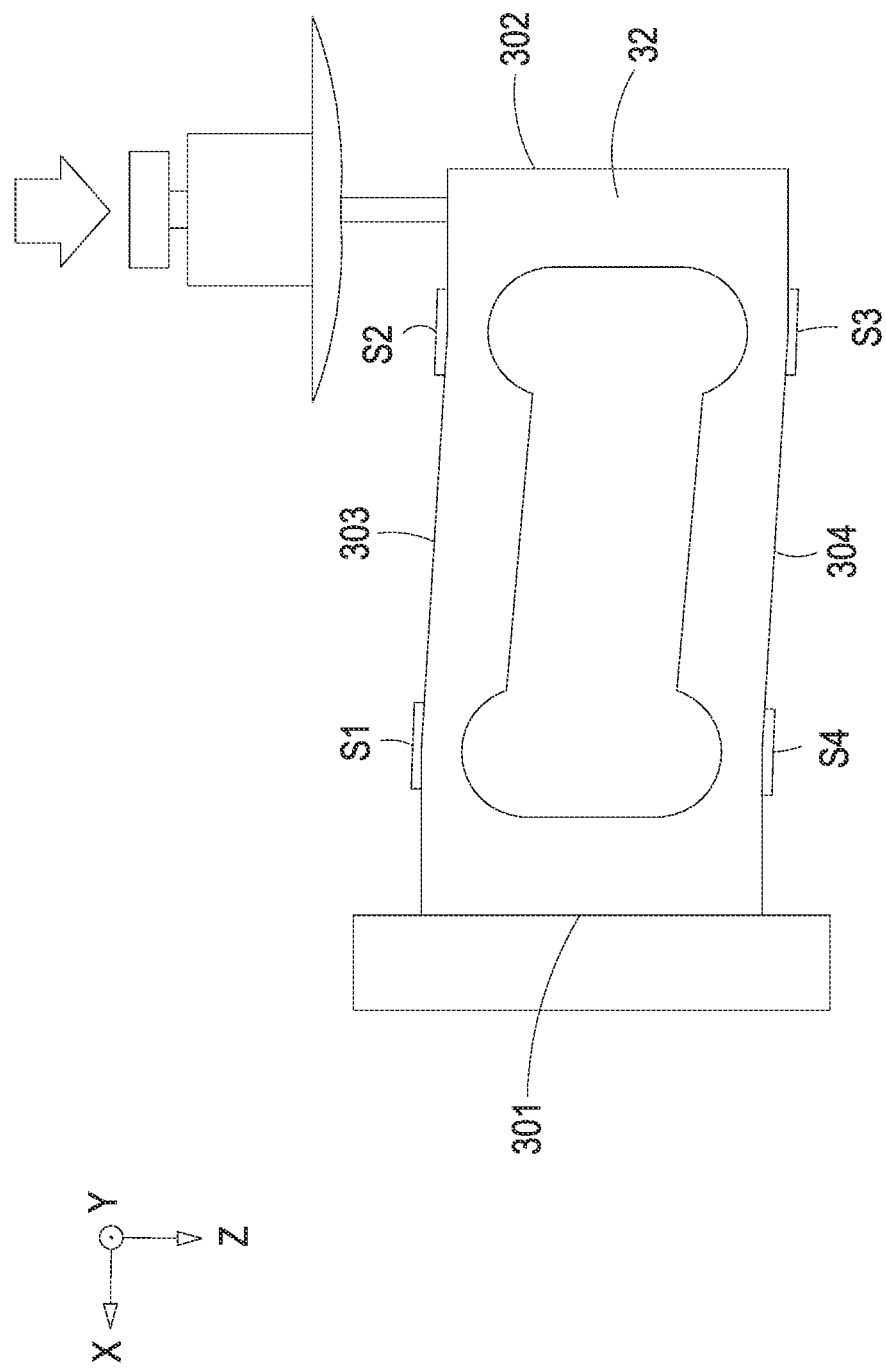
FIG. 17 shows the deformation of the load cell when a force is exerted on the load cell.
Figure 18:
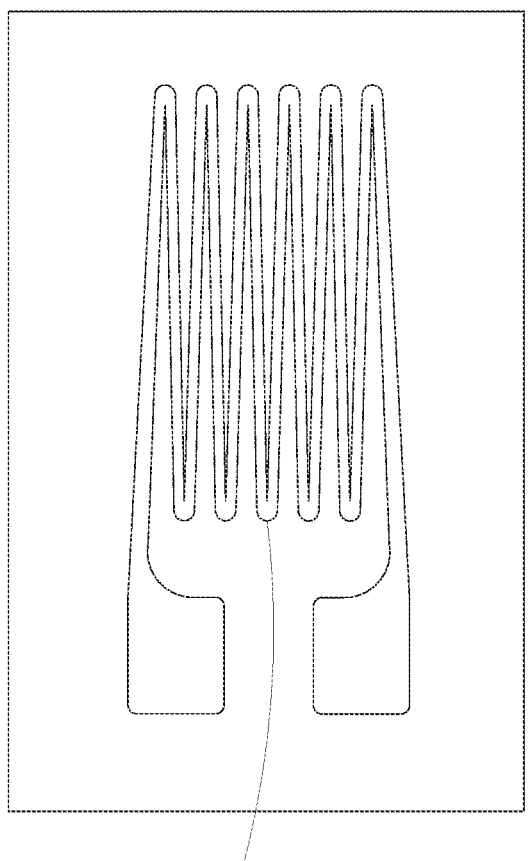
FIG. 18 shows an exemplary shape of the strain gauge stretched by the force exerted on the load cell.
Figure 19:
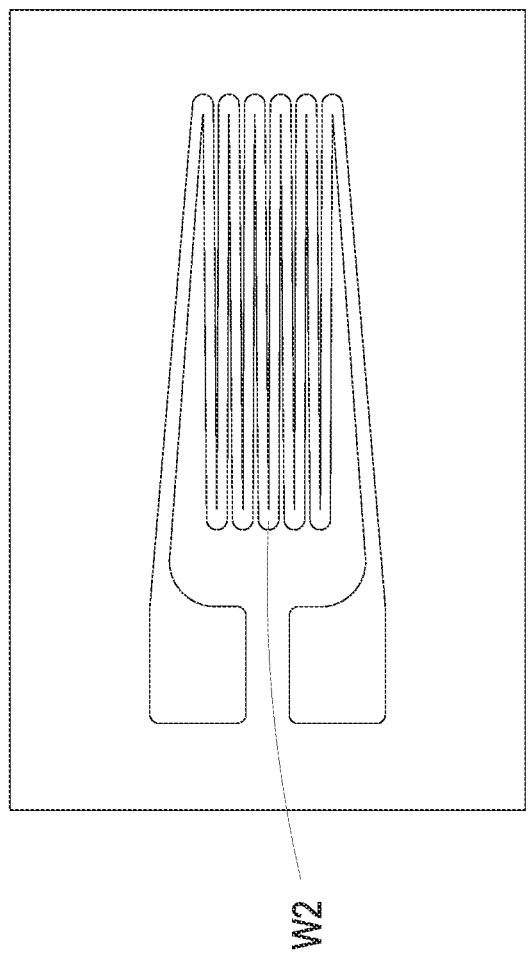
FIG. 19 shows an exemplary shape of the strain gauge compressed by the force exerted on the load cell.

Preferably but not exclusively, the load cell 30 of the present disclosure is a strain gauge load cell. FIG. 14 schematically shows a first exemplary structure of the load cell utilized in the present disclosure. FIG. 15 schematically shows an exemplary structure of a strain gauge utilized in the present disclosure. FIG. 16 is a circuit diagram of the load cell of the present disclosure. FIG. 17 shows the deformation of the load cell when a force is exerted on the load cell. FIG. 18 shows an exemplary shape of the strain gauge stretched by the force exerted on the load cell. FIG. 19 shows an exemplary shape of the strain gauge compressed by the force exerted on the load cell. The load cell 30a includes a spring element 32, four strain gauges S1 to S4, and a hollow portion 33. The spring element 32 includes a first side 301, a second side 302, a third side 303 and a fourth side 304. The first side 301 and the second side 302 are opposite to each other. The third side 303 and the fourth side 304 are opposite to each other. Moreover, the third side 303 and the fourth side 304 are connected between the first side 301 and the second side 302, respectively. Preferably but not exclusively, the first side 301 is parallel to the first direction (i.e., the Z-axis direction), and the second side 302 is parallel to the first direction (i.e., the Z-axis direction). Moreover, the third side 303 is perpendicular to the first direction (i.e., the Z-axis direction), and the fourth side 304 is perpendicular to the first direction (i.e., the Z-axis direction). Certainly, the present disclosure is not limited thereto. In the embodiment, the four strain gauges S1 to S4 are secured and symmetrically disposed on and the third side 303 and the fourth side 304 of the spring element 32. Preferably but not exclusive, the strain gauge S1 and the strain gauge S4 are two strain gauges spatially corresponding to each other, and are symmetrically disposed on the third side 303 and the fourth side 304, respectively. Preferably but not exclusive, the strain gauge S2 and the strain gauge S3 are two strain gauges spatially corresponding to each other, and are symmetrically disposed on the third side 303 and the fourth side 304, respectively. Preferably but not exclusive, the spring element 32 of the load cell 30a is made of aluminum, alloy steel, or stainless steel. The hollow portion 33 passes through the spring element 32. When the force is exerted on the second side 302 of the load cell 30a in the first direction (i.e., the Z-axis direction), the second side 302 is moved relative to the first side 301, the spring element 32 is slightly deformed, and unless overloaded, always returns to its original shape. As the spring element 32 deforms, the strain gauges S1 to S4 secured on the spring element 32 also change shape, so that the force is measured and standardized under a specific range. Each strain gauge S1 to S4 is constructed by a wire W0 or foil, which is set up in a zigzag pattern and attached to the spring element 32. In the embodiment, the four strain gauges S1 to S4 are set in a bridge circuit as shown in FIG. 16. When the shape of the strain gauges S1 to S4 is altered, a change in its electrical resistances R1 to R4 occurs. The resulting alteration to the electrical resistances R1 to R4 in the strain gauges S1 to S4 can be measured as voltage V. The change in voltage V is proportional to the amount of force applied to the load cell 30a, thus the amount of force can be calculated from the output of load cell 30a. As shown in FIGS. 17 to 19, when an end of the load cell 30a is subjected to a force from the rotary motor 40, the load cell 30a is configured to convert the force applied thereto by the rotary motor 40 into an electrical signal, so that the force generated from the rotary motor 40 is measured and standardized. As the force applied to the load cell 30a increases, the electrical signal changes proportionally. Preferably but not exclusively, as the force applied to the end of the load cell 30a, tension force stretches the strain gauges S1 and S3, and the wires W1 of the strain gauges S1 and S3 get longer, so that it results in an increase in the electrical resistances R1 and R3. Compression force does the opposite. As the force applied to the end of the load cell 30a, the strain gauges S2 and S4 are compressed, and the wires W2 of strain gauges S2 and S4 get shorter, and the electrical resistances R2 and R4 are decreased. With the strain gauges S1 to S4 attached to the spring element 32, it facilitates the load cell 30a to mirror the minute changes to be measured and standardized under a specific range. Certainly, the present disclosure is not limited thereto.

Figure 20:
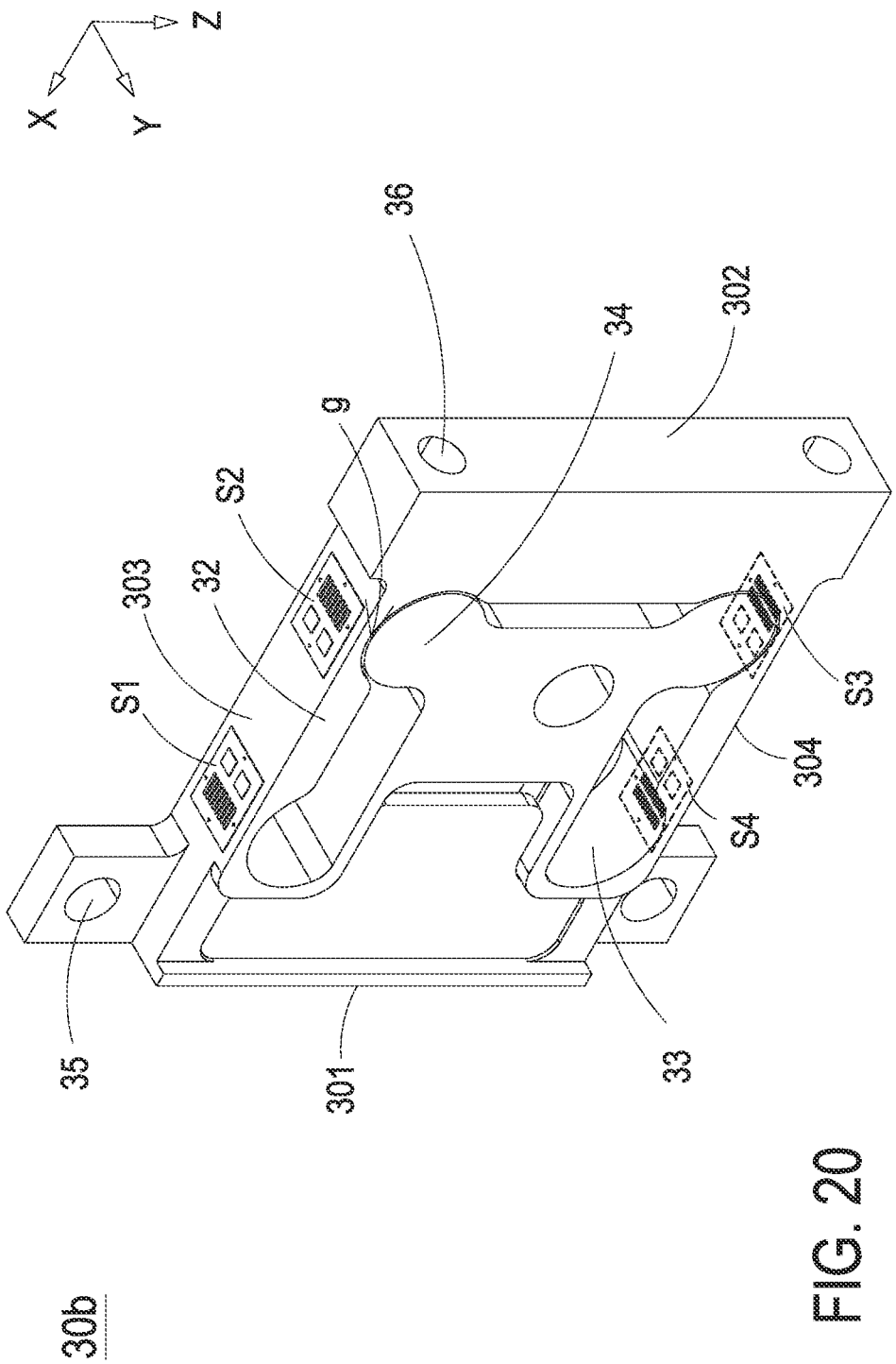
FIG. 20 schematically shows a second exemplary structure of the load cell utilized in the present disclosure.

FIG. 20 schematically shows a second exemplary structure of the load cell utilized in the present disclosure. In the embodiment, the structures, elements and functions of the load cell 30b are similar to those of the load cell 30a in FIG. 14. The elements and features indicated by the numerals similar to those of the foregoing embodiment mean similar elements and features, and are not redundantly described herein. In the embodiment, the load cell 30b further includes two limitation parts 34, connected to the spring element 32, extended into the hollow portion 33 along a direction from the first side 301 toward the second side 302, and spatially corresponding to the strain gauge S2 and the strain gauge S3. In addition, two gaps g are formed between the spring element 32 and the two the limitation parts 34 in the first direction of deformation. Preferably but not exclusively, the two gaps g are arc-shaped, respectively. When an excessive force is exerted on the load cell 30b, the spring element 32 is subjected to deformation till the spring element 32 is contacted to the two limitation parts 34, the corresponding gap g is disappeared. In that, the deformation of the load cell 30b is limited in a certain space. Under the effect of supporting and limiting displacement through the limitation part 34, it prevents the load cell 30b from being damaged due to excessive force deformation. In other embodiments, the profiles of the hollow portion 33 and the limitation part 34 are adjustable according to the practical requirements, but not limited thereto. In the embodiment, the load cell 30b further includes two first fastened holes 35 and two second fastened holes 36. The two first fastened holes 35 are configured to engage with screws or bolts, to mount the load call 30b on the movable magnetic backplane 22. The two second fastened holes 36 are configured to engage with screws or bolts, to mount the load cell 30b on the connection part 41 of the rotary motor 40. Thus, the linear motor 20 and the rotary motor 40 are connected to the first side 301 and the second side 302 of the load cell 30b, respectively, and the load cell 30b is served as the force transducer between the linear motor 20 and the rotary motor 40 in the first direction. Consequently, the force applied by the rotary motor 40 and parallel to the first direction is converted into an electrical signal.

Figure 21:
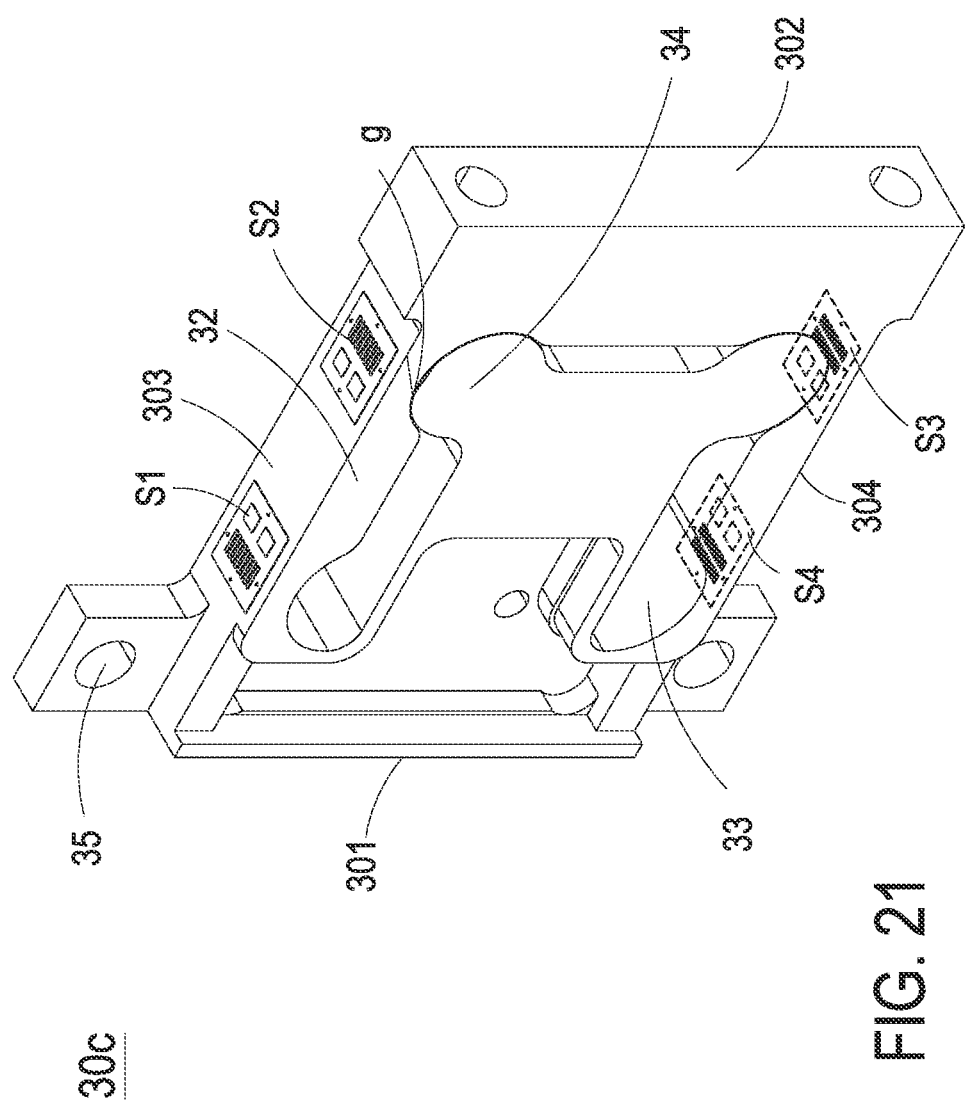
FIG. 21 schematically shows a third exemplary structure of the load cell utilized in the present disclosure.
Figure 22:
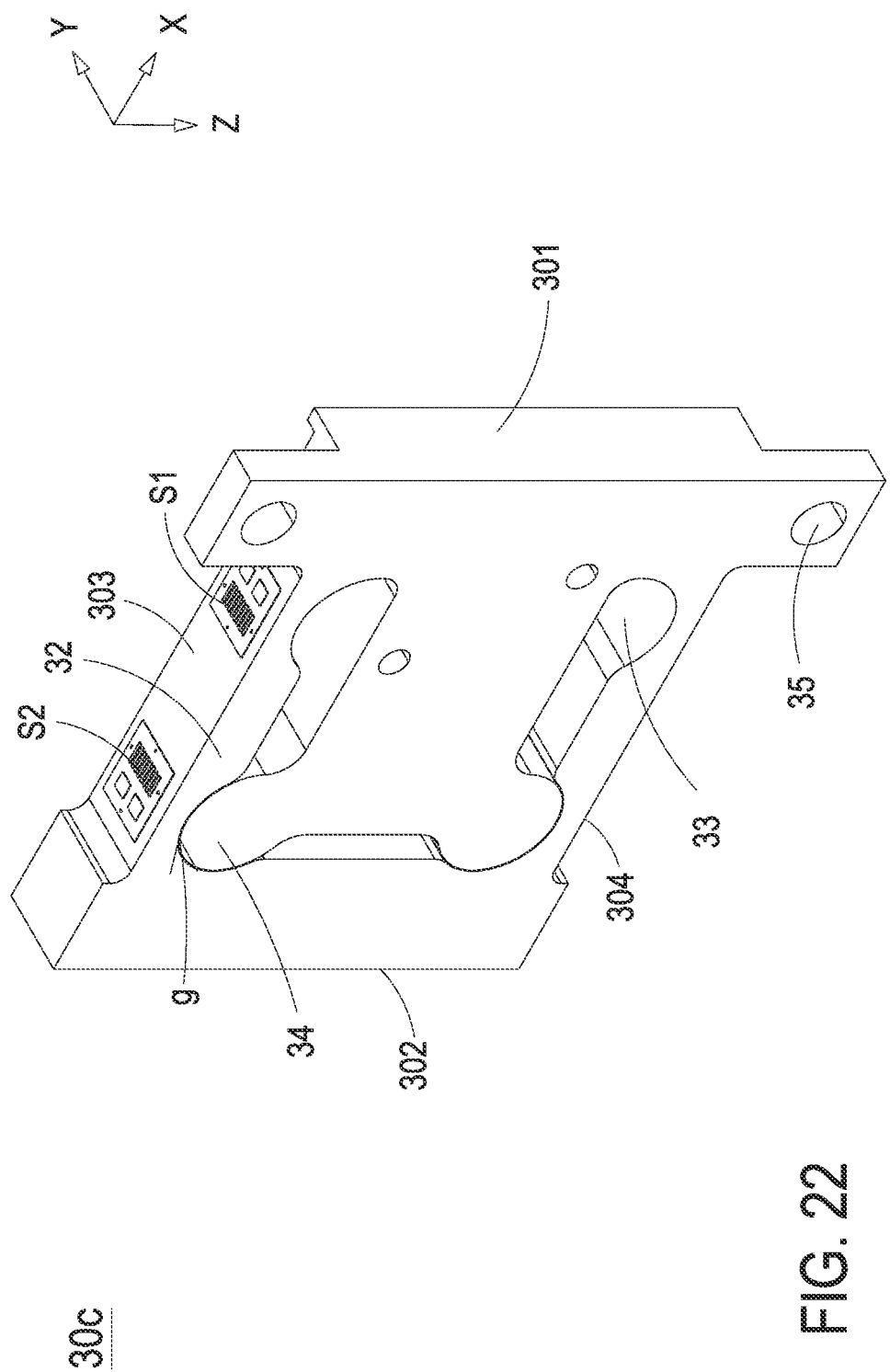
FIG. 22 schematically shows the third exemplary structure of the load cell utilized in the present disclosure and taken from another perspective angle.
Figure 23:
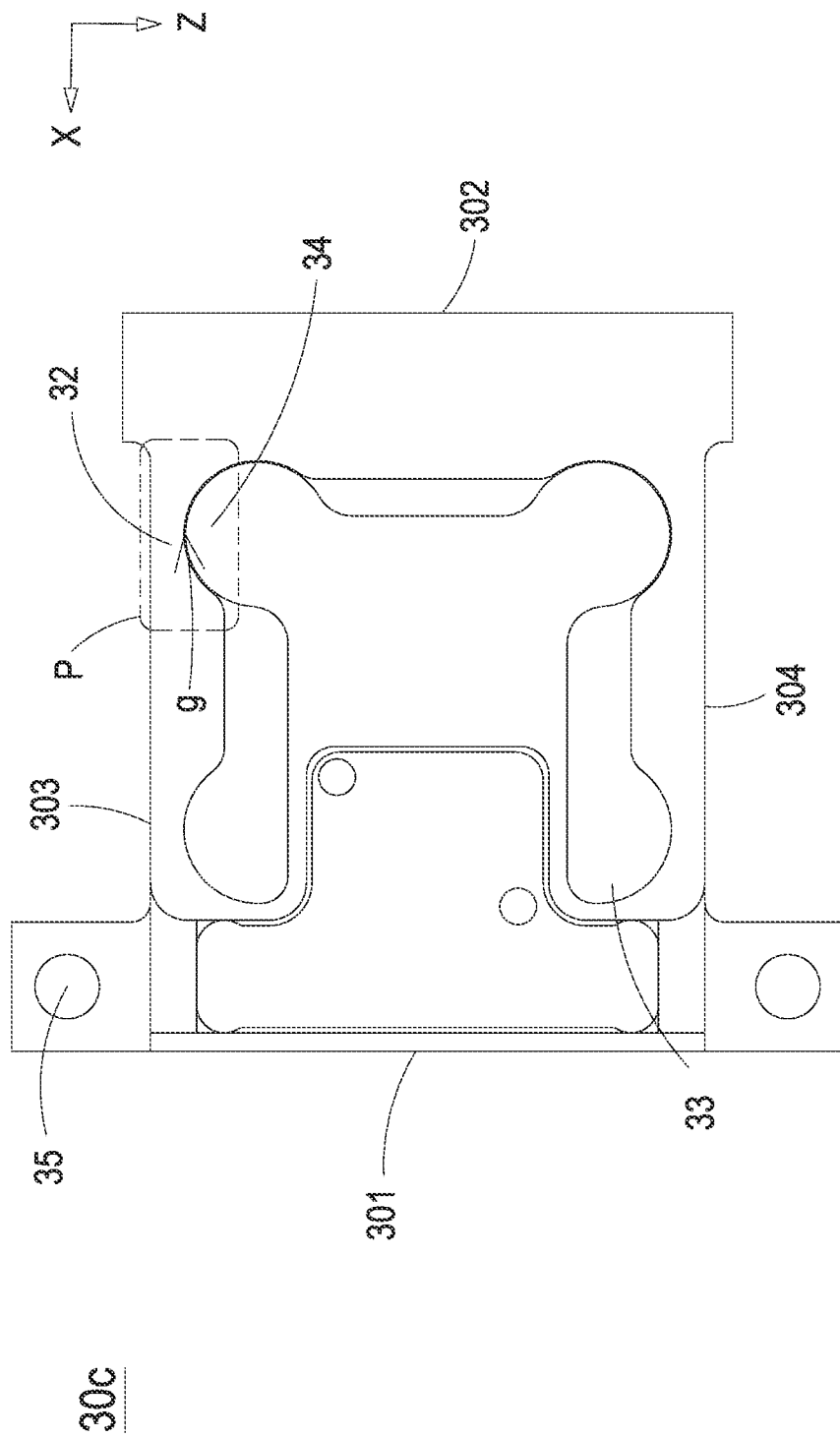
FIG. 23 is a front view of the load cell in FIG. 21.
Figure 24:
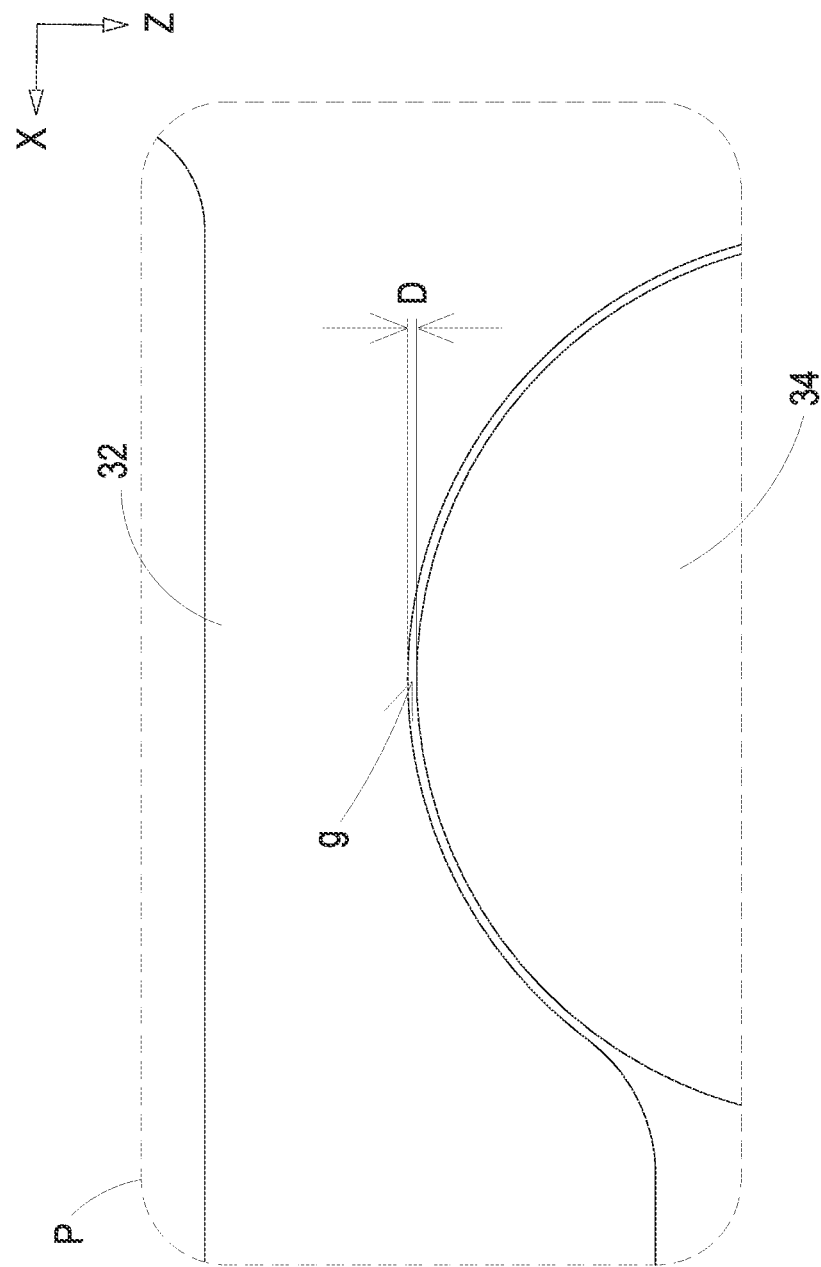
FIG. 24 is an enlarged view of the zone P1 in FIG. 23.

FIG. 21 and FIG. 22 schematically show a third exemplary structure of the load cell utilized in the present disclosure. FIG. 23 is a front view of the load cell in FIG. 21. FIG. 24 is an enlarged view of the zone P1 in FIG. 23. In the embodiment, the structures, elements and functions of the load cell 30c are similar to those of the load cell 30b in FIG. 20. The elements and features indicated by the numerals similar to those of the foregoing embodiment mean similar elements and features, and are not redundantly described herein. In the embodiment, the load cell 30c includes two limitation parts 34, which are extended into the hollow portion 33 along a direction from the first side 301 toward the second side 302, which is the reverse of the X-axis direction. The two limitation parts 34 spatially correspond to the two strain gauges S2 and S3, respectively, and are adjacent to the corresponding strain gauges S2 and S3. Preferably but not exclusively, the spring element 32 and the limitation parts 34 are integrally formed into one piece and are made of aluminum, alloy steel, or stainless steel. Two gaps g are formed, and each gap g is formed between the spring element 32 and the corresponding limitation part 34 in the first direction. The two gaps g spatially correspond to the pair of strain gauges S2 and S3, respectively. In the embodiment, the gap g includes a spaced distance D between the spring element 32 and the corresponding limitation part 34 in the first direction, for example but not limited to the Z-axis direction. When a force is exerted on the load cell 30c for example along the first direction (i.e., the Z-axis direction) or the reverse of the first direction, the spring element 32 is subjected to deformation, and the spaced distance D of the corresponding gap g is gradually reduced. Until the spaced distance D of the gap g is disappeared, the force under a specific range and exerted on the load cell 30c is measured by the load cell 30c accurately. On the other hand, when an excessive force over the specific range is exerted on the load cell 30c, the spaced distance D of the corresponding gap g is completely disappeared, but the deformation of the load cell 30c is limited in a certain space by the limitation parts 34. In other words, the spaced distance D is inversely proportional to the force. When the spaced distance D in one of the two gaps g is reduced to zero, the force is greater than the specific range, and the spring element 32 is supported by the two limitation parts 34 to limit deformation of the spring element 32. Preferably but not exclusively, the load cell 30c includes the two gaps g having the spaced distance D at 0.2 mm between the limitation parts 34 and the spring element 32, and is utilized to measure the force under 5 kg. With the design of the two gap g between the two limitation parts 34 and the spring element 32, an excessive force of 50 kg exerted on the load cell 30c is affordable without damaging the spring element 32 of the load cell 30c. Under the effect of supporting and limiting displacement through the limitation part 34, it prevents the spring element 32 of the load cell 30c from being damaged due to excessive force deformation. In other embodiments, the profiles of the hollow portion 33 and the limitation part 34 are adjustable according to the practical requirements, but not limited thereto.

Figure 25:
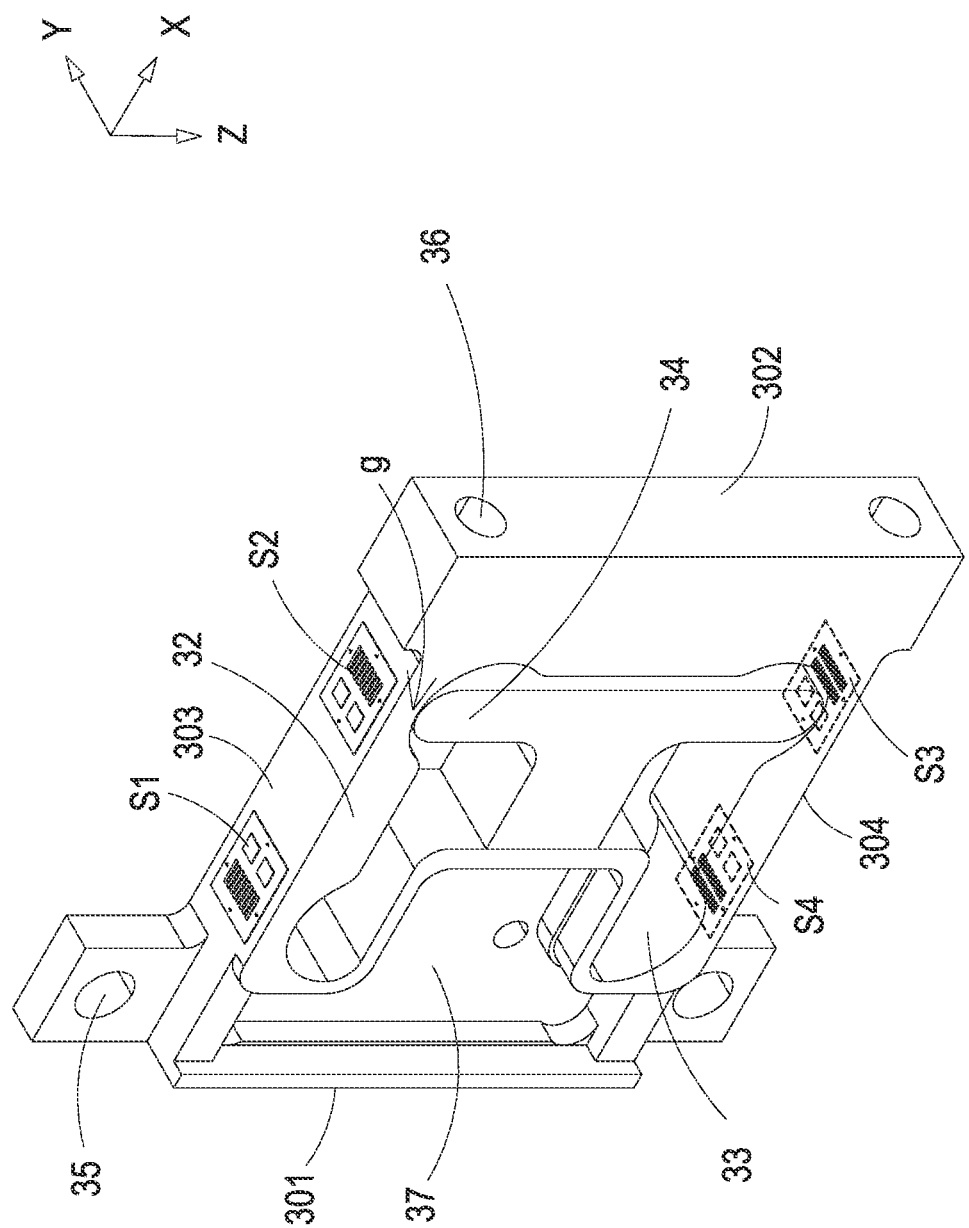
FIG. 25 schematically shows a fourth exemplary structure of the load cell utilized in the present disclosure.
Figure 26:
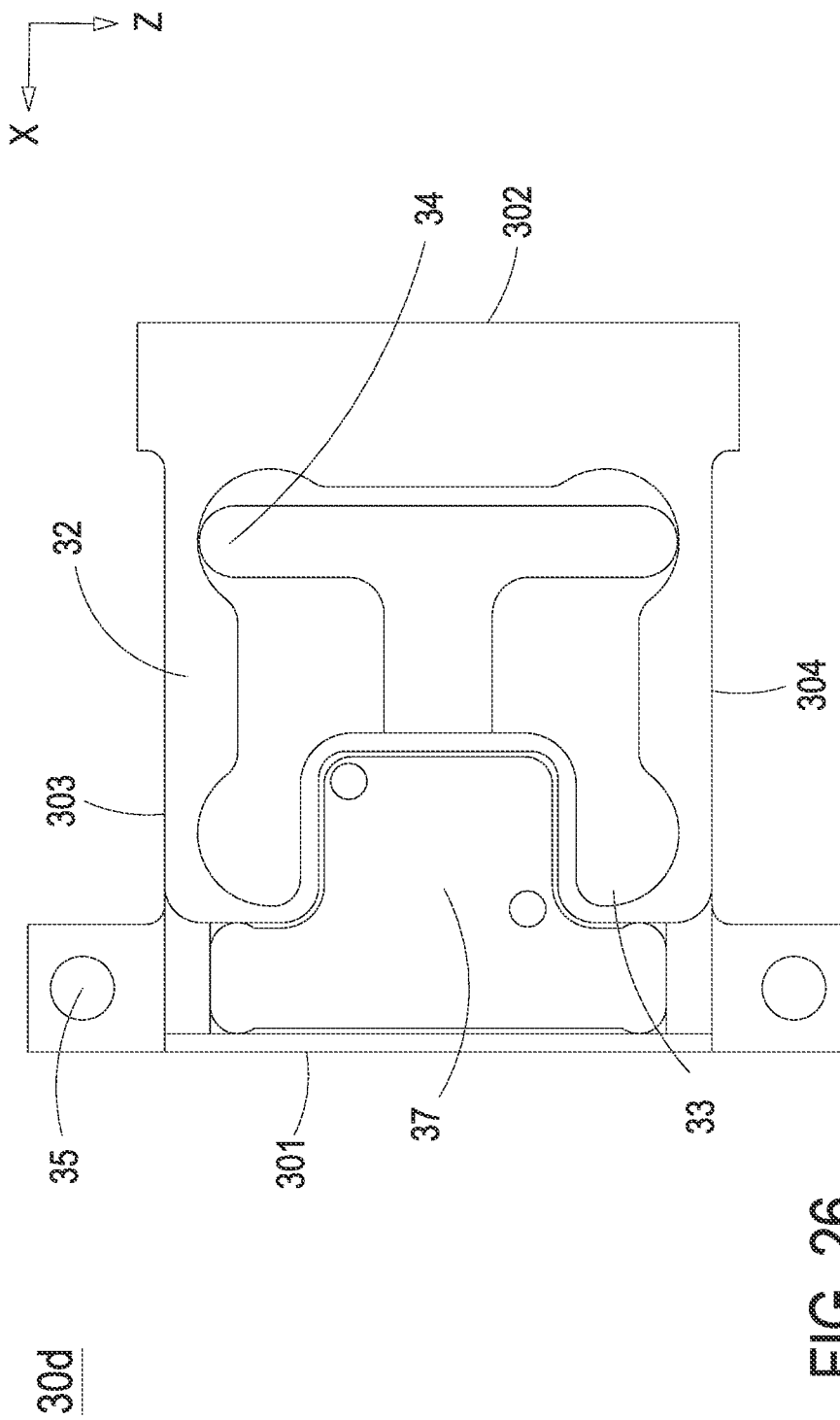
FIG. 26 is a front view of the load cell in FIG. 25.

FIG. 25 schematically shows a fourth exemplary structure of the load cell utilized in the present disclosure. FIG. 26 is a front view of the load cell in FIG. 25. In the embodiment, the structures, elements and functions of the load cell 30*d* are similar to those of the load cell 30*b* in FIG. 20. The elements and features indicated by the numerals similar to those of the foregoing embodiment mean similar elements and features, and are not redundantly described herein. In the embodiment, the load cell 30*d* further includes a joint part 37 connected between the first side 301 of the spring element 32 and the limitation parts 34. Preferably but not exclusively, the spring element 32 and the joint part 37 are made of aluminum, to provide the stretchability needed for deformation. Preferably but not exclusively, the limitation parts 34 are made of stainless steel, so as to provide the rigidity needed for supporting and limiting displacement. On the other hand, comparing to the load cell 30*c* of FIG. 23, the volume of the limitation parts 34 of the load cell 30*d* is reduced, and the volume of the hollow portion 33 of the load cell 30*d* is increased. Each gap g of the load cell 30*d* has the same distance D as that of load cell 30*c*. By increasing the volume ratio of the hollow portion 33 relative to the limitation parts 34, it facilitates the load cell 30*d* to reduce the entire weight. In other embodiments, the profiles of the hollow portion 33 and the limitation part 34 are adjustable according to the practical requirements, but not limited thereto.

Figure 27:
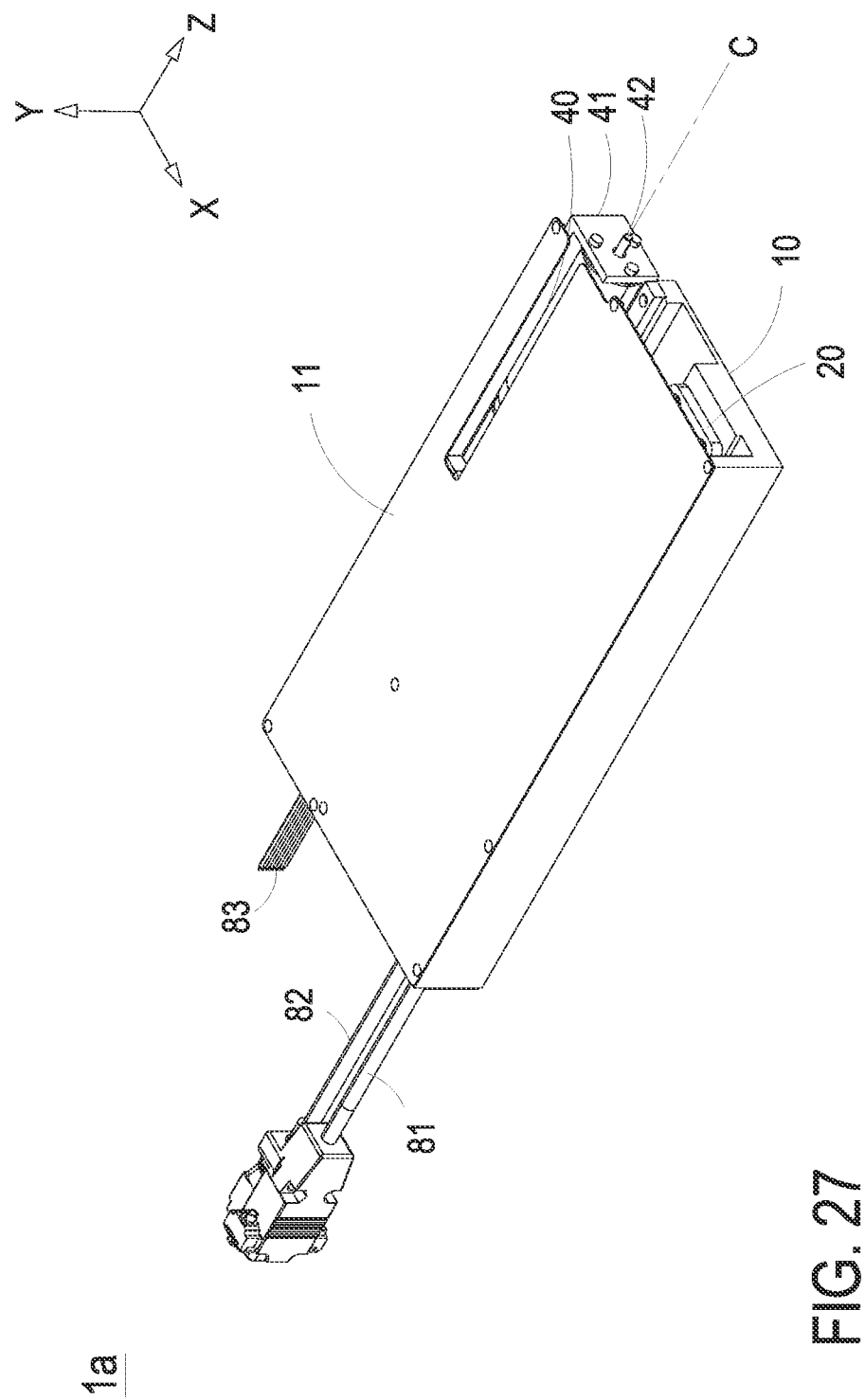
FIG. 27 is a schematic exterior view illustrating a linear actuator according to a second embodiment of the present disclosure.
Figure 28:
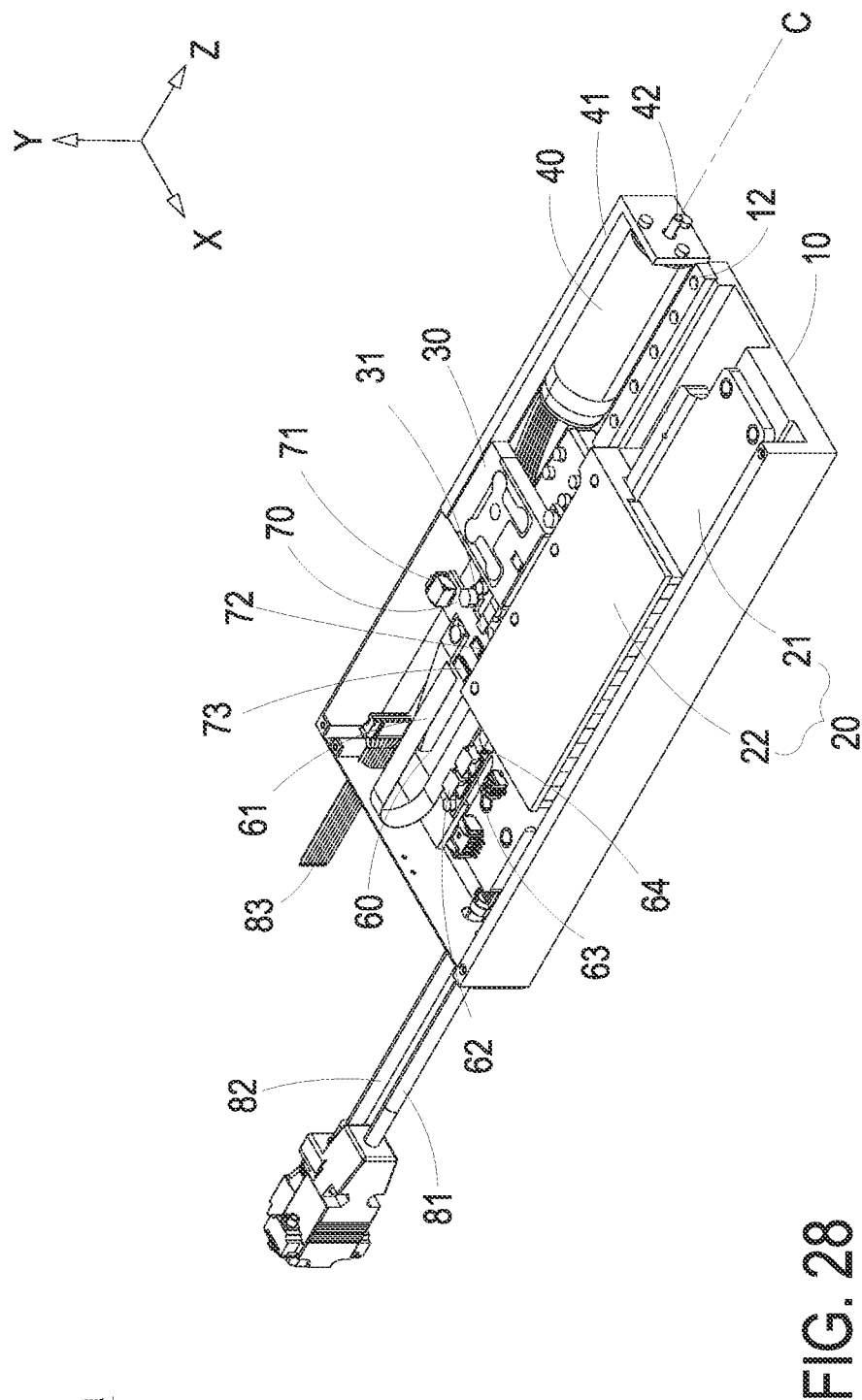
FIG. 28 is a schematic interior view illustrating the linear actuator according to the second embodiment of the present disclosure.
Figure 29:
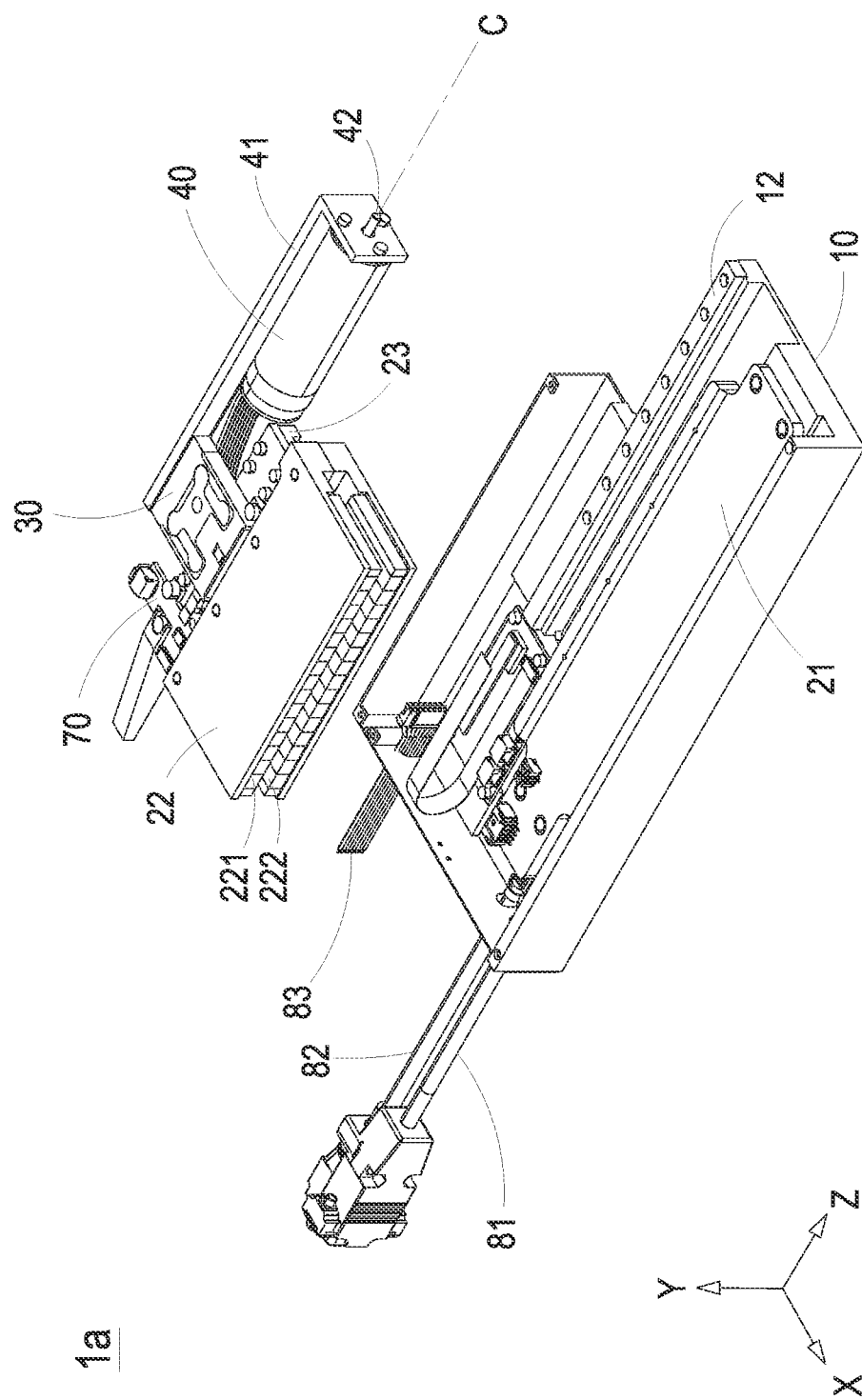
FIG. 29 is a schematic exploded view illustrating the linear actuator according to the second embodiment of the present disclosure.
Figure 30:
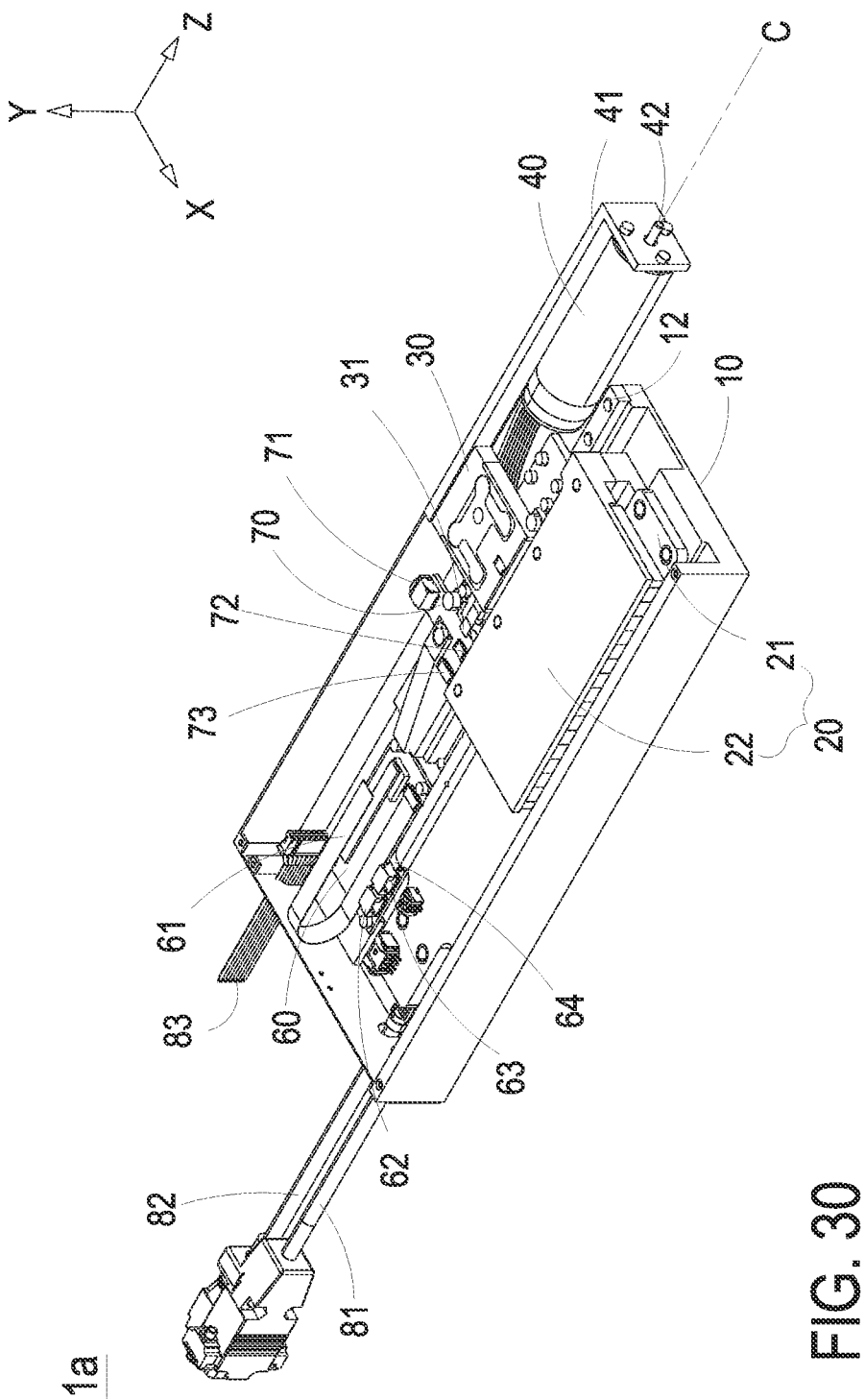
FIG. 30 shows the movable magnetic backplane sliding relative to the fixed coil module of the linear actuator according to the second embodiment of the present disclosure.

FIG. 27 is a schematic exterior view illustrating a linear actuator according to a second embodiment of the present disclosure. FIG. 28 is a schematic interior view illustrating the linear actuator according to the second embodiment of the present disclosure. FIG. 29 is a schematic exploded view illustrating the linear actuator according to the second embodiment of the present disclosure. FIG. 30 shows the movable magnetic backplane sliding relative to the fixed coil module of the linear actuator according to the second embodiment of the present disclosure. In the embodiment, the structures, elements and functions of the linear actuator 1*a* are similar to those of the linear actuator 1 in FIGS. 1 to 5. The elements and features indicated by the numerals similar to those of the first embodiment mean similar elements and features, and are not redundantly described herein. In the embodiment, the connection board 70, the load cell 30 and the rotary motor 40 are arranged along the first direction (i.e., the Z-axis direction). Moreover, the load cell 30 and the rotary motor 40 are assembled with each other through the L-shaped connection part 41. Comparing to the arrangement of the linear actuator 1 in the first embodiment, the arrangement of the linear actuator 1*a* is advantage of saving space and minimizing the entire size. Certainly, the arrangements of the linear actuator 1 and the linear actuator 1*a* are adjustable according to the practical requirements. The present disclosure is not limited thereto and not redundantly described hereafter.

Figure 31:
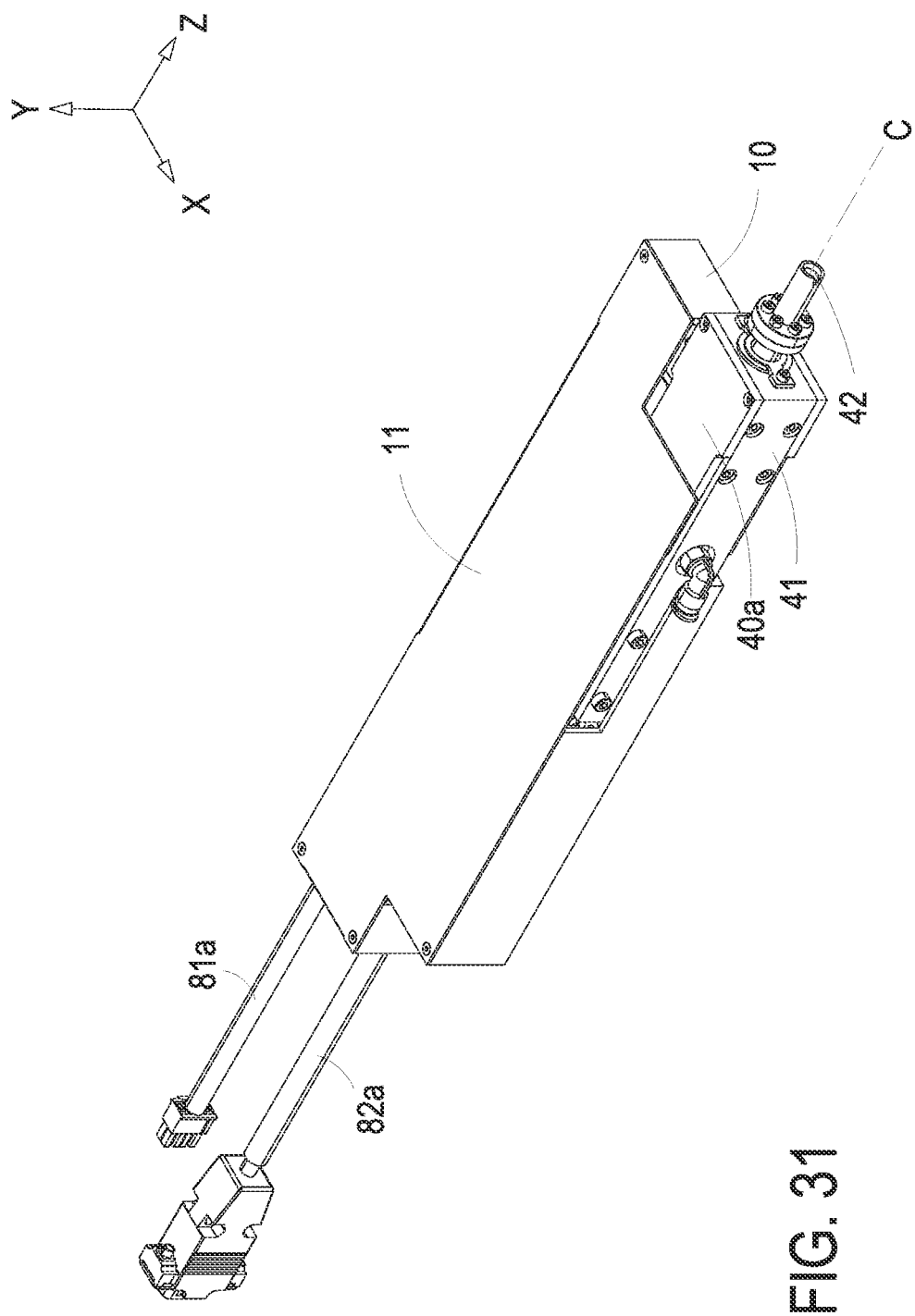
FIG. 31 is a schematic exterior view illustrating a linear actuator according to a third embodiment of the present disclosure.
Figure 32:
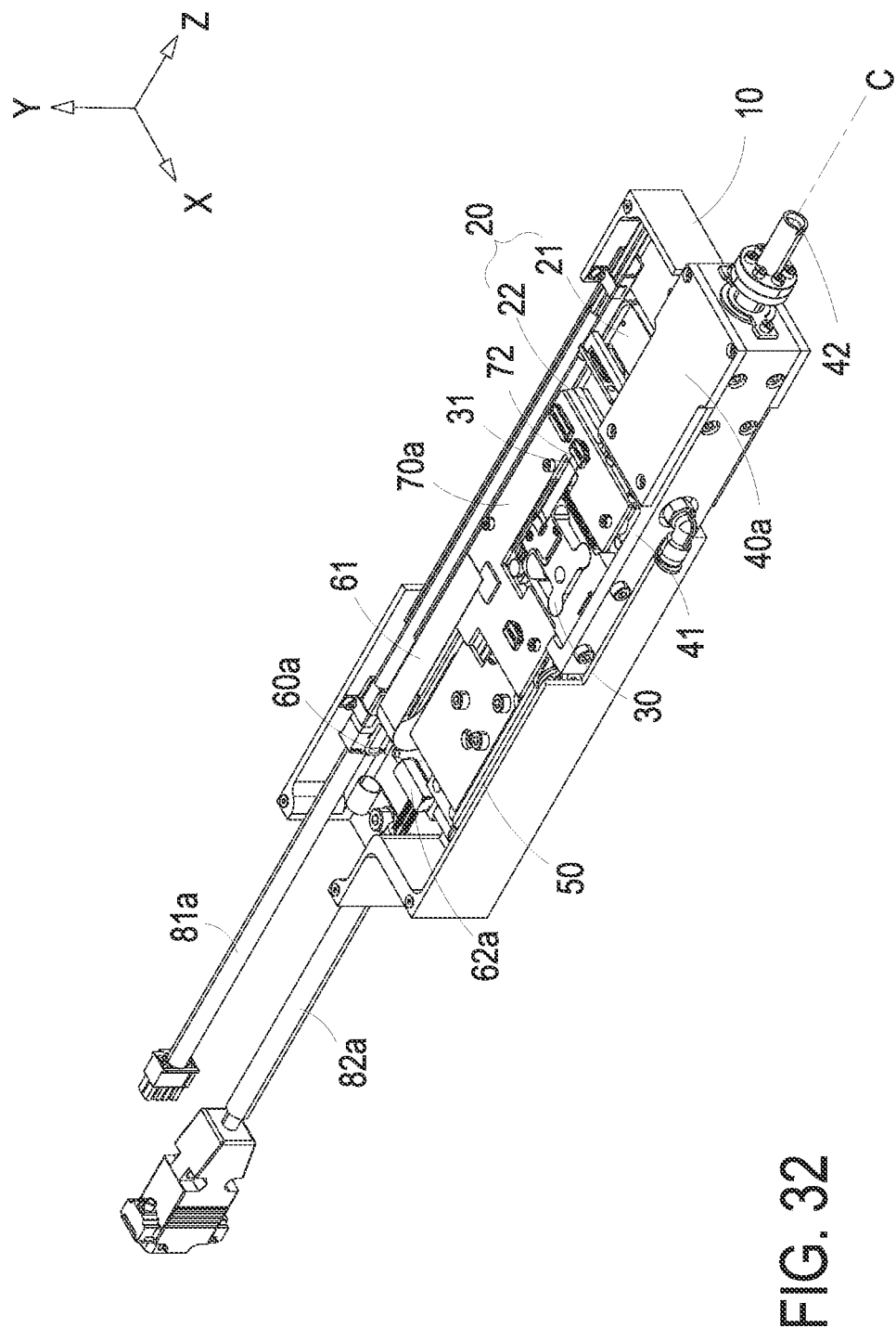
FIG. 32 is a schematic interior view illustrating the linear actuator according to the third embodiment of the present disclosure.
Figure 33:
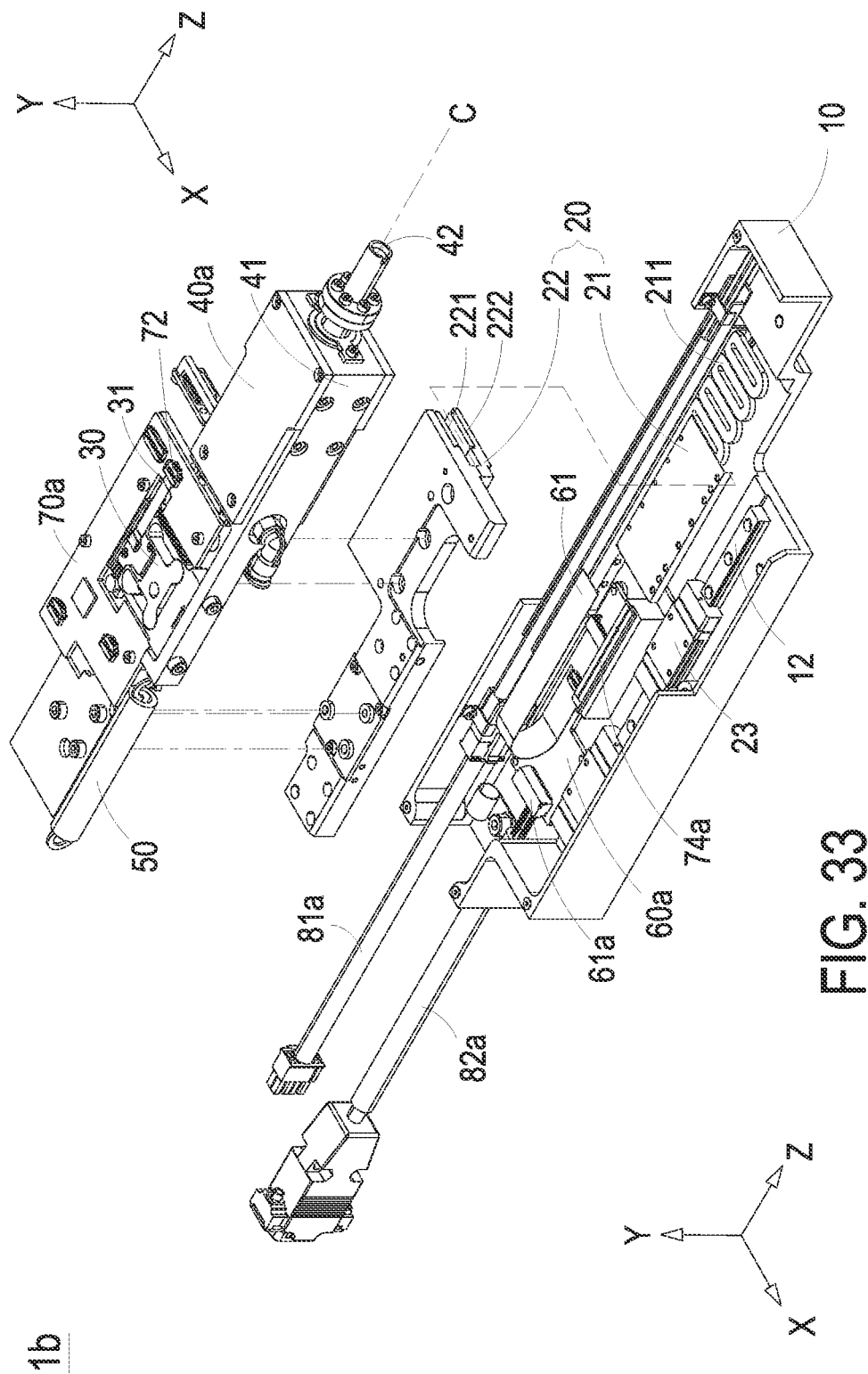
FIG. 33 is a schematic exploded view illustrating the linear actuator according to the third embodiment of the present disclosure.
Figure 34:
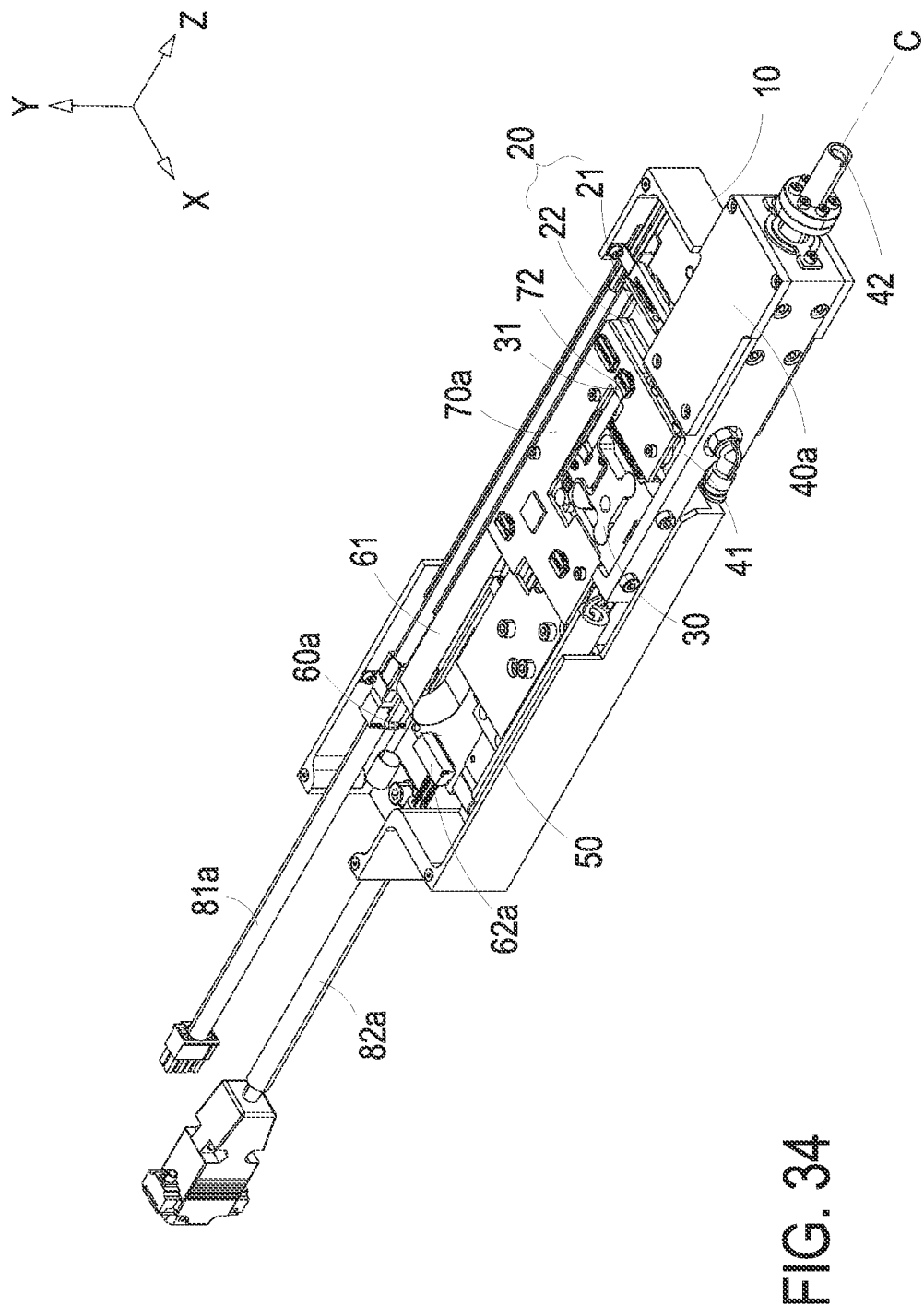
FIG. 34 shows the movable magnetic backplane sliding relative to the fixed coil module of the linear actuator according to the third embodiment of the present disclosure.

FIG. 31 is a schematic exterior view illustrating a linear actuator according to a third embodiment of the present disclosure. FIG. 32 is a schematic interior view illustrating the linear actuator according to the third embodiment of the present disclosure. FIG. 33 is a schematic exploded view illustrating the linear actuator according to the third embodiment of the present disclosure. FIG. 34 shows the movable magnetic backplane sliding relative to the fixed coil module of the linear actuator according to the third embodiment of the present disclosure. In the embodiment, the structures, elements and functions of the linear actuator 1*b* are similar to those of the linear actuator 1 in FIGS. 1 to 5. The elements and features indicated by the numerals similar to those of the first embodiment mean similar elements and features, and are not redundantly described herein. In the embodiment, the load cell 30 is mounted and stacked on the movable magnetic backplane 22 in a second direction, such as Y-axis direction, which is perpendicular to the first direction. Namely, a projection of the load cell 30 on base 10 and a projection of the movable magnetic backplane 22 on base 10 are partially overlapped. Moreover, the load cell 30 and the rotary motor 40*a* are adjacent to the connection part 41 and mounted thereon, so that the load cell 30 and the rotary motor 40*a* are arranged in the first direction, for example but not limited to the Z-axis direction. In addition, the communication printed circuit board 60*a* is disposed adjacent to the linear motor 20 and the load cell 30 in the first direction (i.e., the Z-axis direction). The connection board 70*a* is mounted and stacked on the linear motor 20. Consequently, the linear motor 20, the load cell 30, the rotary motor 40*a*, the communication printed circuit board 60*a* and the connection board 70*a* are arranged in the first direction, for example but not limited to the Z-axis direction, and a slim arrangement of the linear actuator 1*b* is realized. With the slim arrangement of the linear actuator 1*b*, when the linear actuator 1*b* is hung up in the first direction (i.e. the Z-axis direction), each element arranged along the first direction (i.e., the Z-axis direction) is close to the center of gravity of the entire linear actuator 1*b* in the first direction (i.e., the Z-axis direction). When the linear actuator 1*b* is applied to a process of picking and placing components in the first direction (i.e., the Z-axis direction), it is easy to hang up the linear actuator 1*b* and minimize the offset of each element relative to the center of gravity of the entire linear actuator 1*b* in the first direction. It facilitates to avoid shaking due to the movement of the linear actuator 1*b* along the direction of X-axis direction or Y-axis direction, or the force exerted on the rotary motor 40*a* of the linear actuator 1*b* along the first direction. On the other hand, in the embodiment, the communication printed circuit board 60*a* includes an integrated connector 61*a*, which is configured to electrically connect to the driver 80 through a cable 82*a* for transmitting the feedback of the load cell 30 and the information of the rotary motor 40*a* to the driver 80. Furthermore, the linear motor 20 and the rotary motor 40*a* are electrically connected to the driver 80 through a power cable 81*a*, so that the electrical power is provided to the linear motor 20 and the rotary motor 40*a*. In the embodiment, the linear encoder 74*a* is further disposed under the connection board 70*a* mounted on the movable magnetic backplane 22 for minimizing the entire volume of the linear actuator 1*b*. In the embodiment, the anti-fall module 50 is disposed between the base 10 and the connection part 41, and the rotary motor 40*a*, the load cell 30 and the movable magnetic backplane 22 of the linear motor 20 are mounted on the connection part 41. In that, it prevents the movable magnetic backplane 22, the load cell 30 and the rotary motor 40*a* from falling. Preferably but not exclusively, the anti-fall module 50 is a spring and includes two opposite ends connected to the base 10 and the connection part 41, respectively. Certainly, in other embodiments, the arrangement of the linear motor 20, the load cell 30, the rotary motor 40*a*, the anti-fall module 50, the communication printed circuit board 60*a* and the connection board 70*a* are adjustable according to the practical requirements. The present disclosure is not limited thereto, and not redundantly described herein.

From the above descriptions, the present disclosure provides a linear actuator having a load cell for calibrating a force generated thereby. Since the linear motor and rotary motor are connected to two opposite sides of the load cell, the load cell and the linear motor are partially overlapped and stacked on the base, so as to minimize the entire size of the linear actuator. Moreover, at least two of the main components are arranged along the first direction, so as to minimize the offset relative to the center of gravity of the entire linear actuator in the first direction. It facilitates the linear actuator to be hung up and applied to a process of picking and placing components in the first direction. Namely, the linear actuator of the present disclosure has the load cell mounted thereon to form a slim arrangement. When the linear actuator is applied to a process of picking and placing components, the supporting and the center of gravity of the entire linear actuator are offset in the direction of picking and placing components. With the slim arrangement, it facilitates to avoid shaking due to the movement or the force exerted thereon. In addition, with the load cell to calibrate a force generated by the linear actuator, when the linear actuator is applied to the process of picking and placing components in a reciprocating motion, the force applied to the components is measured by the load cell, and the correction of the force and the position in the reciprocating motion is preformed. Thus, the precision of positional accuracy in each reciprocating motion is maintained. It prevents from over compression and chipping during the process of picking and placing the components. Moreover, the load cell is for example a strain gauge load cell including a spring element and a set of strain gauges for measuring the force in a specific range. When the force is exerted on the load cell, the spring element of the load cell is slightly deformed, and unless overloaded, always returns to its original shape. As the spring element deforms, the strain gauges disposed on the spring element are also deformed, and the deformation of strain gauges is converted into an electrical signal, which is fed back to the driver connected to the linear actuator. Namely, the amount of the force is calculated according to the output of the load cell and fed back to the driver connected to the linear actuator. It facilitates the driver connected to the linear actuator to control the linear actuator and maintain the precision of positional accuracy in the process of picking and placing components. Moreover, the temperature effect during operation is eliminated and the reproducibility of force is achieved. On the other hand, in order to avoid an over loading, which causes an irreversible permanent deformation and material damage of the load cell, a special design of a limitation part is introduced to the structure of the load cell. The load cell is subjected to deformation in a certain space. Under the effect of supporting and limiting displacement through the limitation part, it prevents the load cell from being damaged due to excessive force deformation.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A linear actuator hung through a connection component along a first direction, and comprising:
   a base;
   a linear motor disposed on the base and comprising a fixed coil module and a movable magnetic backplane, wherein the fixed coil module is fixed on the base, and the movable magnetic backplane is configured to slide relative to the fixed coil module along the first direction;
   a linear encoder disposed between the base and the movable magnetic backplane of the linear motor and configured to detect a linear displacement of the movable magnetic backplane relative to the base;
   a rotary motor rotated around a central axis in parallel with the first direction; and
   a load cell having two opposite sides parallel to the first direction, respectively, wherein the movable magnetic backplane of the linear motor and the rotary motor are connected to the two opposite sides of the load cell, respectively, wherein the load cell is subjected to a force applied thereto by the rotary motor and parallel to the first direction, and configured to convert the force into an electrical signal.

2. The linear actuator according to claim 1, wherein at least two of the load cell, the movable magnetic backplane and the fixed coil module are stacked on the base in a second direction vertical to the first direction.

3. The linear actuator according to claim 1, wherein a projection of the load cell on the base and a projection of the movable magnetic backplane on the base are partially overlapped, wherein a projection of the movable magnetic backplane on the base and a projection of the fixed coil module on the base are partially overlapped.

4. The linear actuator according to claim 1, wherein the movable magnetic backplane spatially corresponds to the fixed coil module and comprises a first group of magnet members and a second group of magnet members, wherein the first group of magnet members and the second group of magnet members are disposed on two opposite inner surfaces of the movable magnetic backplane and spatially correspond to two outer surfaces of the fixed coil module, wherein the first group of magnet members are arranged along the first direction, and the second group of magnet members are arranged along the first direction.

5. The linear actuator according to claim 1, wherein the fixed coil module comprises a plurality of coil members arranged one by one along the first direction.

6. The linear actuator according to claim 1, wherein the base comprises a linear guiding rail, and the linear motor comprises a sliding member fixed on the movable magnetic backplane, wherein the sliding member is slidably coupled to the linear guiding rail and freely reciprocates along a length direction of the linear guiding rail.

7. The linear actuator according to claim 1, wherein the rotary motor comprises a connection part, and the rotary motor is mounted on the load cell through the connection part.

8. The liner actuator according to claim 7, wherein the connection part of the rotary motor and the movable magnetic backplane of the linear motor are mounted on two opposite sides of the load cell.

9. The linear actuator according to claim 1, wherein the rotary motor comprises a working head disposed at an end of the rotary motor and configured to perform a process of picking and placing a component.

10. The linear actuator according to claim 1, further comprising an anti-fall module disposed between the base and the movable magnetic backplane of the linear motor.

11. The linear actuator according to claim 1, further comprising an anti-fall module disposed between the base and the rotary motor.

12. The linear actuator according to claim 1, further comprising a communication printed circuit board and a connection board, wherein the communication printed circuit board is mounted on the base, and the connection board is mounted on the movable magnetic backplane of the linear motor, wherein the communication printed circuit board is electrically connected to the connection board.

13. The linear actuator according to claim 12, wherein at least two of the linear motor, the load cell, the communication printed circuit board, the connection board and the rotary motor are arranged along the first direction.

14. The linear actuator according to claim 12, further comprising a cover assembled with the base for accommodating the linear motor, the load cell, the rotary motor, the communication printed circuit board and the connection board.

15. The linear actuator according to claim 12, further externally connected to a driver, wherein the driver is electrically connected to the linear motor and the rotary motor, and configured to control the linear motor and the rotary motor, respectively.

16. The linear actuator according to claim 15, wherein the load cell and the rotary motor are electrically connected to the driver through the connection board and the communication printed circuit board.

17. The linear actuator according to claim 1, wherein the load cell comprises a spring element, at least one strain gauge and a hollow portion, wherein the at least one strain gauge is secured on the spring element, and the hollow portion passes through the spring element, wherein when the force is exerted on the load cell, the spring element is deformed, and the at least one strain gauge changes shape, so that the force generated from the rotary motor is measured and standardized.

18. The linear actuator according to claim 17, wherein the load cell further comprises at least one limitation part extended into the hollow portion, and at least one gap is formed between the spring element and the limitation part in the first direction.

19. The linear actuator according to claim 1, wherein at least two of the linear motor, the load cell and the rotary motor are arranged along the first direction.

20. The linear actuator according to claim 1, wherein the connection component is a cable connecting the linear actuator to a driver.

* * * * *